(12) United States Patent
George et al.

(10) Patent No.: US 11,426,908 B2
(45) Date of Patent: Aug. 30, 2022

(54) MOULD EQUIPMENT FOR PIPELINE SECTION COATING AND METHODS FOR COATING OF PIPELINE SECTIONS WITH MOULDS

(71) Applicant: PIPELINE INDUCTION HEAT LIMITED, Burnley (GB)

(72) Inventors: Michael George, Lancashire (GB); Anthony Dibble, Lancashire (GB); Nicholas Barker, Lancashire (GB)

(73) Assignee: Pipeline Induction Heat Ltd., Burnley (GB)

( * ) Notice: Subject to any disclaimer, the term of this patent is extended or adjusted under 35 U.S.C. 154(b) by 1067 days.

(21) Appl. No.: 14/454,053

(22) Filed: Aug. 7, 2014

(65) Prior Publication Data

US 2015/0042007 A1 Feb. 12, 2015

(30) Foreign Application Priority Data

Aug. 9, 2013 (GB) .................................... 1314340

(51) Int. Cl.
*B29C 45/14* (2006.01)
*F16L 55/162* (2006.01)
(Continued)

(52) U.S. Cl.
CPC ...... *B29C 45/14598* (2013.01); *B29C 33/302* (2013.01); *B29C 33/307* (2013.01);
(Continued)

(58) Field of Classification Search
None
See application file for complete search history.

(56) References Cited

U.S. PATENT DOCUMENTS 3,654,219 A * 4/1972 Boyer, et al. ............ C08K 7/14
524/508
3,865,662 A 2/1975 Segal
(Continued)

FOREIGN PATENT DOCUMENTS

CN 202691413 U 1/2013
CN 203010020 U 6/2013
(Continued)

OTHER PUBLICATIONS

Louis C. Dorworth: "Composite Tooling", in "Composites", Dec. 1, 2001, ASM International, USA, XP055067073, ISBN: 978-0-87-170703-1, pp. 434-440, *1,7*.

(Continued)

*Primary Examiner* — Mohammad M Ameen
(74) *Attorney, Agent, or Firm* — Kofi A. Schulterbrandt

(57) ABSTRACT

A mold for coating a pipeline section with molten coating material from an injection molding machine, wherein the mold comprises a shell of impervious material reinforced by an exoskeleton of non-distensible material. An assembly for supporting a mold comprising a plurality of mutually separable shell bodies for coating a pipeline section, wherein the assembly comprises motorized opening and closing of the shell bodies in a straight line. An assembly for supporting a bent pipeline section wherein the assembly comprises a base and a pair of arms extending from the base, wherein each arm comprises a respective clamping collar for clamping a bent pipe section between the arms. A vehicle for induction heating a bent pipeline section, wherein the vehicle comprises: a helical induction coil; and wheels arranged to guide movement of both ends of the induction coil through a tubular inside face of a bent pipeline section.

24 Claims, 23 Drawing Sheets

(51) Int. Cl.
    *B29C 45/17*         (2006.01)
    *B29C 33/30*         (2006.01)
    *F16L 58/10*         (2006.01)
    *F16L 58/18*         (2006.01)
    *F16L 59/20*         (2006.01)
    *F16L 59/22*         (2006.01)
    *B29D 23/00*         (2006.01)
    *H05B 6/10*          (2006.01)
    *H05B 6/38*          (2006.01)
    *B29K 509/08*       (2006.01)
    *B29L 23/00*         (2006.01)

(52) U.S. Cl.
    CPC .......... *B29C 45/1744* (2013.01); *B29D 23/00* (2013.01); *F16L 55/162* (2013.01); *F16L 58/109* (2013.01); *F16L 58/181* (2013.01); *F16L 59/20* (2013.01); *F16L 59/22* (2013.01); *H05B 6/101* (2013.01); *H05B 6/38* (2013.01); *B29C 2791/003* (2013.01); *B29D 23/001* (2013.01); *B29K 2509/08* (2013.01); *B29L 2023/001* (2013.01); *B29L 2023/004* (2013.01)

(56) References Cited

U.S. PATENT DOCUMENTS 4,459,251 A     7/1984     Eldridge et al.
5,094,607 A  *  3/1992     Masters ................. B29C 33/38
                                                                                         114/347
2009/0260736 A1   10/2009   Charette
2011/0297316 A1   12/2011   Jackson et al.
2013/0030878 A1    1/2013   Weaver

FOREIGN PATENT DOCUMENTS

| | | |
|---|---|---|
| EP | 0190103 | 8/1986 |
| EP | 0190103 A2 * | 8/1986 |
| EP | 436805 A | 7/1991 |
| EP | 0825435 | 2/1998 |
| EP | 1415897 | 5/2004 |
| EP | 1626220 | 2/2006 |
| EP | 2189695 A | 5/2010 |
| FR | 2565157 | 12/1985 |
| GB | 1 220 349   * | 1/1971 |
| GB | 1220349 | 1/1971 |
| GB | 2334318 | 8/1999 |
| JP | 11118068 A | 4/1999 |
| JP | 2010043715 A | 2/2010 |
| WO | 2007/086666 | 8/2007 |
| WO | 2013070074 A | 5/2013 |

OTHER PUBLICATIONS

Great Britain Exam Report dated Aug. 9, 2019.

* cited by examiner

MOULD EQUIPMENT FOR PIPELINE SECTION COATING AND METHODS FOR COATING OF PIPELINE SECTIONS WITH MOULDS

CROSS-REFERENCE TO RELATED APPLICATIONS

This application claims priority, under 35 U.S.C. § 119 (a)-(d), to UK Patent Application No. GB 1314340.9 filed Aug. 9, 2013, the contents of which are incorporated herein by reference in its entirety.

FIELD OF THE INVENTION

The present invention relates to improvements in mold equipment for pipeline section coating, improvements in methods for making mold equipment and improvements in methods for coating of pipeline sections with molds.

BACKGROUND OF THE INVENTION

Pipelines in the oil and gas industry are typically formed from multiple lengths of steel pipeline sections that are welded together end-to-end as they are being laid. To prevent corrosion of the pipeline sections and to reduce heat loss of fluids transported by pipelines, the pipeline sections are coated with one or more protective or insulative layers. The pipeline sections are usually coated at a factory remote from the location in which they are to be laid. This is often referred to as factory-applied coating and it is generally more cost effective than coating pipeline sections on site where they are laid. At the factory, the coating is applied to the outside of the pipeline sections whereupon a short length is left uncoated at either end of the pipeline section. The uncoated ends are necessary to enable the pipeline sections to be welded together to form the pipeline in the field.

Polypropylene coating has good protective and insulative properties and it is commonly used to coat pipelines transporting fluids at up to 140 degrees centigrade. Polypropylene is widely used for factory-applied coating for pipeline sections used to form pipelines. The pipe coating can take several different forms depending on the particular application and will normally consist of more than one layer. A conventional pipe coating will typically comprise a first thin layer of a primer, such as an epoxy-based material, that is applied in either liquid or powdered form to the outer surface of the steel pipeline section. To ensure a good bond between the pipeline section and the primer, the pipeline section is typically blast cleaned and etched with an appropriate anchor pattern. A second layer of polypropylene chemically modified to act as an adhesive will then usually be applied over the primer during the curing time (i.e. time taken to harden or set) of the primer. While curing of the primer is ongoing, and so as to allow the all the layers to bond, a third layer is applied. Typically, the third layer is polypropylene and a common process for coating pipelines with polypropylene is the Injection Molded Polypropylene (IMPP) technique. An IMPP coating is typically applied while the steel pipeline section is heated by induction heating, for instance. All but the ends of the pipeline section is enclosed by a heavy duty steel mold that defines a cavity around the uncoated pipeline section, which is subsequently filled with molten polypropylene from an IMPP injection molding machine in the factory. Control of the heating, so the factory-applied coating is sufficiently heated to allow fusion to occur when the molten polypropylene is introduced into the mold, requires skill. The mold must be of heavy duty construction, often incorporating hydraulic opening and closing mechanisms in order to withstand high molding pressures. The IMPP injection molding machine which dispenses polypropylene into the mold is normally closely coupled to the mold. Once the polypropylene has cooled and solidified, the mold is removed to leave the factory-applied coating in place on the pipeline section.

Before the pipeline can be laid the welded ends, known as field joints, must be coated in the region of the joint to prevent corrosion of the pipeline. The coating in these regions is referred to as the field joint coating. Two common processes for coating field joints of pipelines formed from polypropylene coated pipeline sections are the IMPP technique and an Injection Molded Polyurethane (IMPU) technique. Patent publication No. WO2009/027686 discloses a filed joint coating technique which permits fusion to occur between the pipe and the field joint coatings.

BRIEF SUMMARY OF THE INVENTION

According to a first aspect of the invention, there is provided a mold for coating a pipeline section with molten coating material from an injection molding machine, wherein the mold comprises a shell of impervious material reinforced by an exoskeleton of non-distensible material. Casting and/or machining a special shape of pipeline section mold from steel is costly and time consuming. Once a steel mold has been made it can be used for only one shape of pipeline coating. The present invention provides a pipeline section mold that may be lighter, quicker to make and less expensive than a comparable mold made from solid steel. Advantageously, the pipeline section mold of the present invention has a versatile design that is readily adaptable to different shapes of coating. Its components may be recycled for use in various different shapes of pipeline section molds.

Preferably, the exoskeleton is made from a plurality of parts. The exoskeleton may be made from a kit of parts. The parts may be standard parts that may be assembled in different ways to suit customer preferences, with or without specially commissioned parts to suit particular shape of coating.

Preferably, the parts of the exoskeleton are interlocked. This facilitates assembly and may improve structural rigidity of the exoskeleton.

Preferably, parts of the exoskeleton are made of steel. Steel is a readily available of non-distensible material with the sufficient rigidity to reinforce a mold for coating a pipeline section. Preferably, the steel parts of the exoskeleton are welded together. Welding may provide additional rigidity.

Preferably, the exoskeleton comprises parts contoured to complement an inside face of the shell. The exoskeleton may support the shape of the inside face.

Preferably, the mold comprises connection means for connecting the mold to an injection molding machine.

Preferably, the shell is made from molded material. Molded material is lighter, quicker to make and less expensive than casting and/or machining steel. Molded material is versatile since it may be molded according to different shapes and sizes. The molded material may be any impervious material suitable for contact with molten pipeline section coating material from an injection molding machine, like, for example, carbon fiber composite materials or plastic fiber composite materials. Preferably, the molded material is glass-fiber reinforced plastic. Glass-fiber reinforced plastic is readily adaptable to different uses and it is relatively inexpensive. If the molded material is glass-fiber reinforced plastic then its preferred thickness is at least 8 mm.

Preferably, the exoskeleton is at least partially embedded in the shell. This may enhance reinforcement provided by the exoskeleton and increase adhesion to the shell.

Preferably, the shell comprises a plurality of mutually separable shell bodies each having a part of the exoskeleton and wherein the shell bodies are mutually connectable in a sealed relationship with a pipeline section located in a cavity between the shell bodies. This allows the shell bodies to open and close thereby facilitating location of a pipeline section inside the mold. Preferably, the shell bodies are separable at a common central plane in a straight line normal to the central plane. Straight line opening of the shell bodies occupies less space around an entry point to the mold because the shell bodies can be moved from above and/or below the shell bodies. This avoids having an opening mechanism beside the mold which could impede a pipeline section's access. Straight line closing of the shell bodies may provide a more even distribution of pressure that that provided by, for example, pivoting closing of the shell bodies in the manner of a clam shell.

The mold may be for coating an irregular pipeline section or a bent pipeline section. The versatility of the mold of the present invention makes it readily adaptable to different shapes of coating for various shapes of pipeline section at a reasonable cost and within a reasonable time scale.

Preferably, the mold is for coating a pipeline section with a coating of molten polypropylene or a coating of molten polyurethane as these are common coating material with suitable pipeline protection and insulation properties.

Preferably, the mold comprises a section for connection to a molten coating material delivery pipe from an injection molding machine. This may permit injection of molten coating material directly from an injection molding machine.

According to a second aspect of the present invention, there is provided a method of making a mold for coating a pipeline section with molten coating material from an injection molding machine, wherein the method comprises the steps of: (a) forming a shell body of impervious material with an inside face having the shape of a pipeline section coating; and (b) cladding the shell body with an exoskeleton of non-distensible material. The present invention provides a pipeline section mold that may be lighter than a comparable mold made from solid steel and that may be made in less time and for less expense. Advantageously, the present invention provides a method of making a mold that is versatile and readily adaptable to different shapes of coating.

Preferably, the forming step comprises the steps of: (c) laying a shell body of deformable curable material over a pipeline section coating template; (d) curing the shell body; and (e) removing the template from the shell body. A shell body that is deformable and curable may be molded. The result is lighter shell body that is quicker to make and less expensive than casting and/or machining from solid steel. Molded material is versatile since it may be adopt different shapes and sizes. The molded material may be any impervious material suitable for contact with molten pipeline section coating material from an injection molding machine, like, for example, carbon fiber composite materials or plastic fiber composite materials.

Preferably, the method comprises a step of assembling the exoskeleton from a plurality of parts. The exoskeleton may be made from a kit of parts. The parts may be standard parts that may be assembled in different ways to suit customer preferences.

Preferably, the assembling step comprises interlocking parts of the exoskeleton. Interlocking the parts facilitates assembly and may improve structural rigidity of the exoskeleton.

Preferably, the assembling step is preceded by a step of laser cutting parts of the exoskeleton from steel. Laser cutting provides an accurate and versatile manufacturing technique which is also suited to making specially commissioned parts for a particular shape of coating.

Preferably, the assembling step comprises welding steel parts of the exoskeleton. Welding may provide additional rigidity.

Preferably, the forming step comprises laying a shell body over a pipeline section coating template. Use of a template to form the shape of the shell body facilitates accuracy. Preferably, the shell body is glass-fiber reinforced plastic. Glass-fiber reinforced plastic is readily adaptable to different uses and it is relatively inexpensive. If the shell body is made of glass-fiber reinforced plastic, then its preferred thickness is at least 8 mm.

Preferably, the cladding step comprises at least partially embedding the exoskeleton in the shell body. This may enhance reinforcement provided by the exoskeleton and increase adhesion to the shell body. Preferably, the cladding step comprises keying the exoskeleton into the shell body. This may further increase adhesion between the exoskeleton and the shell body.

Preferably, the method steps comprise making a mold having a plurality of mutually separable shell bodies, each shell body being clad by exoskeleton. This allows the shell bodies to open and close thereby facilitating location of a pipeline section inside the mold.

Preferably, the method steps comprise making a mold with an inside face having the shape of a coating for an irregular pipeline section or a bent pipeline section. The method of the present invention is versatile and readily adaptable for making molds having different shapes for coating various shapes of pipeline section at a reasonable cost and within a reasonable time scale.

According to a third aspect of the present invention, there is provided an exoskeleton for use in the second aspect of the present invention.

According to a fourth aspect of the present invention, there is provided a kit of parts for an exoskeleton for use in the second aspect of the present invention.

According to a fifth aspect of the present invention, there is provided a pipeline section coating template for use in the second aspect of the present invention.

According to a sixth aspect of the present invention, there is provided a kit of parts for a pipeline section coating template for use in the second aspect of the present invention.

Preferably, the pipeline section coating template comprises a multitude of inter-connectable parts of varying shapes and sizes. This may enable the kit of parts for a pipeline section coating template to be used, and/or re-used, for various different shapes and sizes of pipeline sections and pipeline section coatings.

According to a seventh aspect of the present invention, there is provided an assembly for supporting a mold comprising a plurality of mutually separable shell bodies for coating a pipeline section with molten coating material from an injection molding machine, wherein the assembly comprises motorized opening and closing of the shell bodies in a straight line. Straight line opening of the shell bodies occupies less space around an entry point to the mold because the shell bodies can be moved from above and/or below the shell bodies. This avoids having an opening mechanism beside the mold which could impede a pipeline section's access. Straight line closing of the shell bodies may provide a more even distribution of pressure that that provided by, for example, pivoting closing of the shell bodies in the manner of a clam shell.

Preferably, the assembly comprises adjustable support for supporting molds of different sizes. Preferably, the assembly comprises adjustable support for supporting molds for coating irregular pipeline sections or bent pipeline sections.

Preferably, the motorized opening and closing is guided by rails. This may provide reliable and accurate movement of the shell bodies. Preferably, the motorized opening and closing is operable with a pipeline section in the mold.

Preferably, the motorized opening and closing is operable to simultaneously move the shell bodies in opposite directions along the straight line. This provides quicker operation as both shell bodies may move at the same time. The shell bodies may adapt more easily to the height of the pipeline section.

Preferably, the assembly comprises a lock for locking the shell bodies closed. This may provide additional security when the shell bodies are pressurized during injection molding. Preferably, the lock is manually operable. This may provide a simple lock mechanism. Preferably, the lock is power assisted. This may provide additional locking force.

Preferably, the assembly is coupled to an injection molding machine. This may provide a more compact working environment around the injection molding machine. The assembly may be transported with the injection molding machine.

Preferably, the motorized opening and closing of the shell bodies is powered by an injection molding machine. This may harness power readily available from an injection molding machine.

According to an eighth aspect of the present invention, there is provided an assembly for supporting a bent pipeline section, wherein the assembly comprises a base and a pair of arms extending from the base, wherein each arm comprises a respective clamping collar for clamping a bent pipe section between the arms, wherein each of the clamping collars has a cylindrical clamping face with a central axis and wherein the central axes of the clamping faces are non-parallel. The clamping collars may hold the bent pipeline section purely at or near, its ends because orientation of the clamping collars relative to each other resists rotation of the a bent pipeline under the effect of gravity. This enables coating material to be applied uninterrupted between the ends of the pipeline section. This provides an improved coating.

Preferably, the central axes of the clamping faces are substantially co-planar. A central plane of a bent pipeline section may be positioned in line with the axes of the cylindrical clamping faces. This may enable the clamping collars to clamp a bent pipeline section with less packing material and/or adjustment at the interface therebetween.

Preferably, the plane of the central axes of the clamping faces is substantially parallel to the base. A central plane of a bent pipeline section may be positioned in line with the base so that when the base is on a factory floor, a bent pipeline section may be orientated in a natural position for approaching a bent pipeline section mold.

Preferably, the arms are adjustably coupled to the base for supporting different sizes of bent pipeline sections. This facilitates versatility and re-use of the assembly.

Preferably, the base is equipped with support wheels or support rollers. This facilitates mobility of the assembly and bent pipe sections clamped thereto. Preferably, the support wheels are configured to run on rails. This facilitates controlled movement of the assembly so that it may approach a bent pipeline section mold in a pre-defined direction. Likewise, the assembly may be moved to a specific parking area for cooling of a recently-applied coating.

Preferably, the clamping collars are operable by threaded fasteners. Threaded fasteners, like, for example, bolts, nuts or screws facilitate uncomplicated opening and closing of the clamping collars with readily available tools.

In a ninth aspect of the present invention, there is provided a vehicle for induction heating a bent pipeline section, wherein the vehicle comprises: a helical induction coil; and wheels arranged to guide movement of both ends of the induction coil through a tubular inside face of a bent pipeline section. A helical induction coil is naturally flexible. Movement of the induction coil is determined by the path followed by the wheels as they trundle along the tubular inside face of the bent pipeline section. Contact between the wheels and the internal profile of the bent pipeline section steers the induction coil through the bent pipeline section. This may help to prevent contact between the induction coil and bent pipeline section which may damage the induction coil, and any coating the coil may have, and helps to prevent a short circuit between the coil and the bent pipeline section.

Preferably, the vehicle comprises a first wheel chassis supporting wheels proximal a first end of the induction coil and a second wheel chassis supporting wheels proximal a second end of the induction coil opposite to the first end thereof. This provides a more balanced support to the induction coil.

Preferably, the first wheel chassis and the second wheel chassis are coupled to each other by an elongate bar having a longitudinal axis. Overextension of the induction coil may cause the induction coil to sag and possibly contact the bent pipeline section. The bar may help to avoid overextension of the induction coil.

Preferably, the bar is passes through the induction coil. This provides a more compact design of vehicle.

Preferably, the first wheel chassis and the second wheel chassis are each coupled to the bar by a respective bearing and wherein the bearings permit pivoting movement of the first wheel chassis and second wheel chassis in relation to the bar in directions normal to the longitudinal axis of the bar. The locations of the bearings provide a sound articulation point for the first and second wheel chassis.

Preferably, the bearings are self-aligning to a position where the first wheel chassis, the second wheel chassis and the bar are aligned. This biases the vehicle into adopting a generally cylindrical profile which may facilitate insertion of the vehicle into pipeline sections.

Preferably, each of the first wheel chassis and the second wheel chassis comprises a plurality of guide wheel assembles each having two wheels with axes arranged in a line tangential to a curved central axis of a bent pipeline section. Thus, the first and second wheel chassis are themselves guided by the internal profile of the bent pipeline section.

Preferably, each of the first wheel chassis and the second wheel chassis comprises three guide wheel assembles. The first and second wheel chassis may be supported through 360 degrees about a longitudinal axis though the induction coil.

Preferably, the guide wheel assembles of each of the first wheel chassis and the second wheel chassis are arranged at equiangular intervals about a longitudinal axis though the induction coil.

Preferably, the induction coil is connectable to an external induction heating power supply. This may avoid the need for an on-board induction heating power supply.

Preferably, the vehicle comprises at least one socket for electrical connection of the induction coil to an external induction heating power supply. This may avoid the need to thread a permanent electrical connection through an end of a bent pipe section before use of the vehicle. Instead, the vehicle may be pushed though a bent pipeline section and connected to an induction heating power supply cable at the end.

Preferably, the at least one socket comprises a socket arranged proximal each end of the vehicle and wherein the sockets provide mechanical connection for pulling the vehicle from each end of the vehicle. This may allow induction heating power supply cables to perform two roles.

Preferably, the induction coil is equipped with electrically insulative spacers protruding from the outer profile of the induction coil. Preferably, or alternatively, the induction coil clad is in an insulative sheath. These measures may provide additional protection against contact between the induction coil and bent pipeline section.

In a tenth aspect of the present invention, there is provided a method of coating a pipeline section with molten coating material with a mold of the first aspect supported by the assembly of the seventh aspect, wherein the method comprises the steps of: a) locating a pipeline section in the mold and sealing the mold about the pipeline section; b) connecting the mold to a molten coating material delivery pipe from an injection molding machine; c) injecting molten coating material from an injection molding machine into the mold until a cavity between the mold and the pipeline section is substantially full of coating material; d) disconnecting the molten coating material delivery pipe from the mold; and e) removing the coated pipeline section from the mold.

Preferably, the pipeline section is a bent pipeline section and the method comprises an additional step of supporting the bent pipeline section with the eighth aspect of the present invention before locating the bent pipeline section in the mold.

Preferably, the method comprises an additional step of supporting the coated bent pipeline section with said assembly at a location remote from said mold after the step of removing the coated bent pipeline section from the mold. This may allow the bent pipeline section and its coating material to cool while the injection molding machine is used for other purposes.

Preferably, the pipeline section is a bent pipeline section and the method comprises an additional step of induction heating the bent pipeline section with the vehicle of the ninth aspect of the present invention.

BRIEF DESCRIPTION OF THE DRAWINGS

The present invention will now be described in more detail with reference to the following drawings of which.

DETAILED DESCRIPTION OF THE INVENTION

Figure 1:
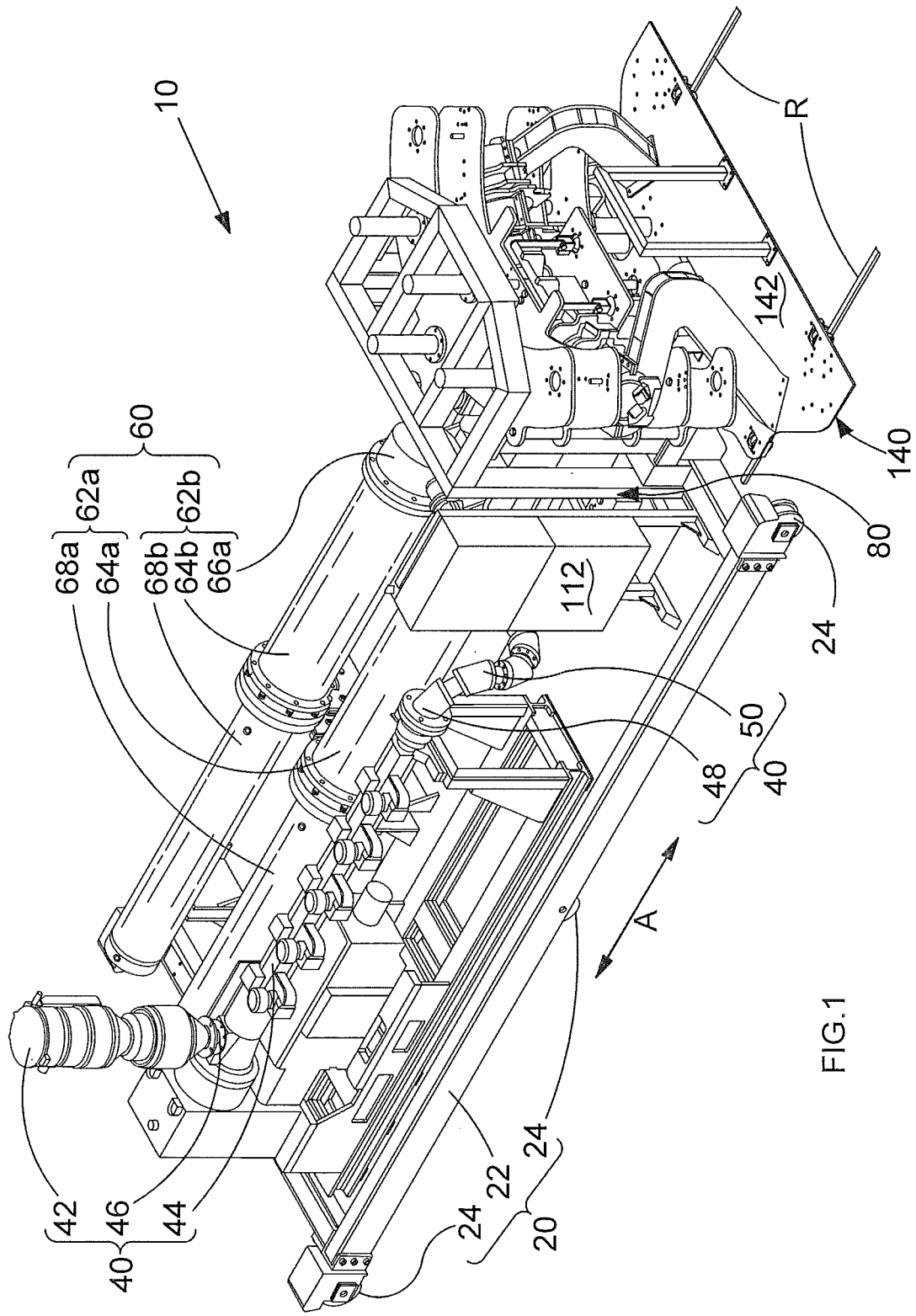
FIG. 1 shows a perspective view of an IMPP injection molding machine for factory-applied coating of steel pipeline sections with a mold and pipeline section on a pipeline section stand.

Referring to FIGS. 1 to 5, an IMPP injection molding machine 10 for factory-applied coating of steel pipeline sections comprises a main support frame 20 onto which are mounted an extruder assembly 40, an accumulator assembly 60, a mold support frame assembly 80, and a hydraulic control circuit 110. Typically, these components are connected together by nuts and bolts so that the IMPP machine 10 may be disassembled and packed into a container for transportation from factory to factory. When reassembled for use in a factory, the control circuit 110 is connected to a hydraulic power supply from a generator or a shore supply. The main support frame 20, the extruder assembly 40, the accumulator assembly 60, the mold support frame assembly 80, and the control circuit 100 each have lifting pints (not shown) to facilitate disassembly and reassembly of the IMPP injection molding machine 10 with the help of an overhead crane.

The main frame assembly 20 comprises a generally rectangular main frame 22 made of steel and support wheels 24 in the middle and at each end of the main frame 22 so that it can be rolled back and forth in the direction of the double-headed arrow A.

The extruder assembly 40 comprises an extruder hopper 42 and an extruder 44 having an inlet 46 in communication with the hopper 42 and an outlet 48. The hopper 42 is configured to receive polypropylene pellets fed automatically from a material conditioning machine. In use, the extruder 44 heats the polypropylene pellets from a solid state to a molten state and pumps the molten polypropylene from the extruder outlet 48, via an extruder delivery pipe 50 and a non-return valve 52, to the accumulator assembly 60. The output capacity of the extruder 42 is approximately 290 kg per hour.

The accumulator assembly 60 comprises a pair of accumulators 62a,62b aligned in parallel with each other. Each accumulator 62a,62b comprises a cylindrical reservoir 64a, 64b having a port 66a,66b in common communication with an outlet 52a from the non-return valve 52. Each accumulator 62a,62b further comprises a hydraulically powered accumulator ram 68a,68b coupled to an end its respective reservoir 64a,64 opposite to its respective port 66a,66b. The ports 66a,66b are in common communication with an accumulator delivery pipe 70 which is configured for connection to an IMPP mold. In use, the reservoirs 64a,64b have a maximum capacity of 100 litres of molten polypropylene from the extruder 44 i.e. a total of 200 litres of molten polypropylene. However, the reservoirs 64a,64b are filled to the volume of molten polypropylene required to do a coating on a pipeline section, plus some contingency molten polypropylene. Next, the accumulator rams 68a,68b force the molten polypropylene from the reservoirs 64a,64b, though the ports 66a,66b and into the accumulator delivery pipe 70. The molten polypropylene is blocked by the non-return valve 52 from returning into the extruder assembly 40.

Figure 2:
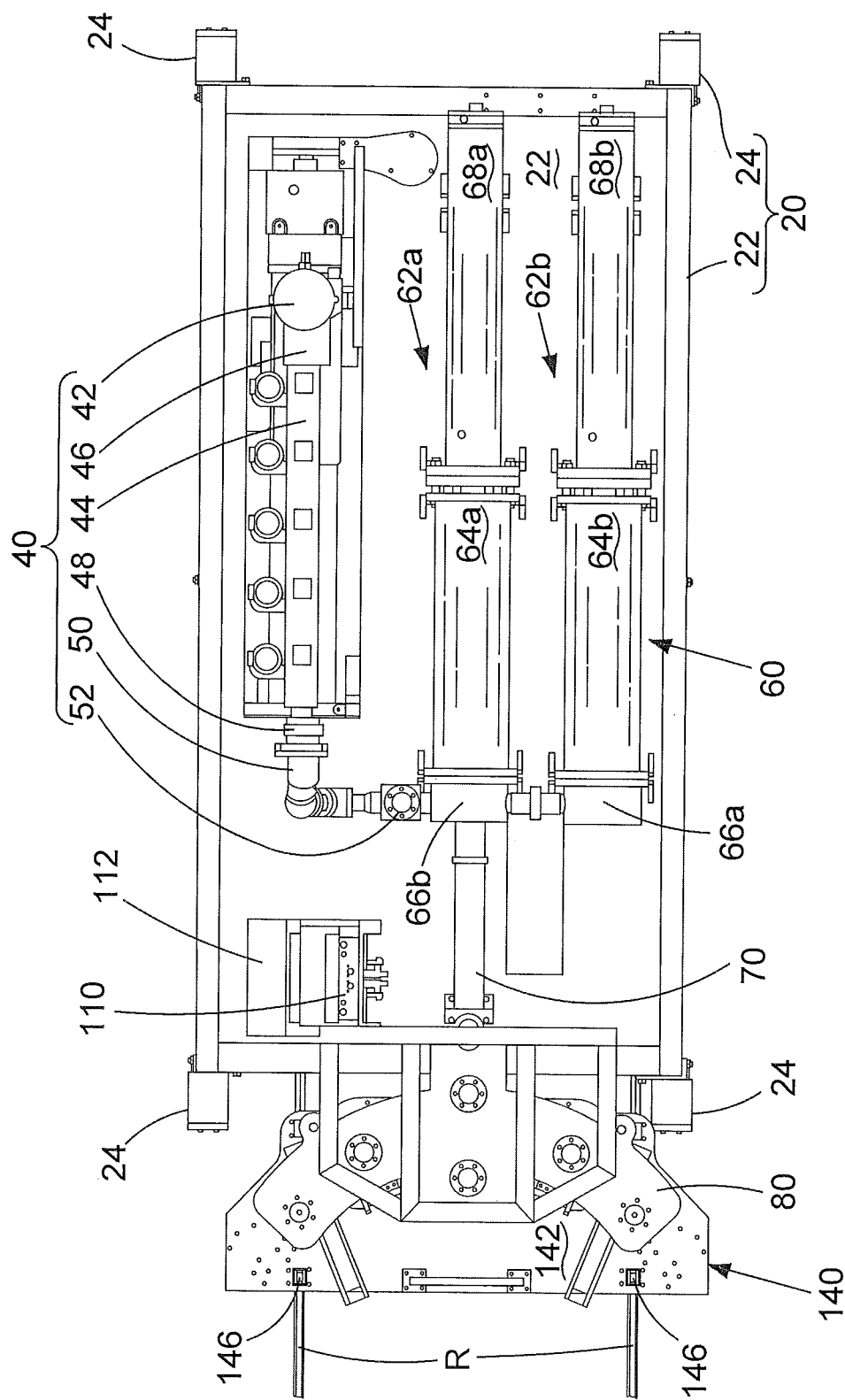
FIG. 2 shows a plan view of the IMPP injection molding machine of FIG. 1.
Figure 3:
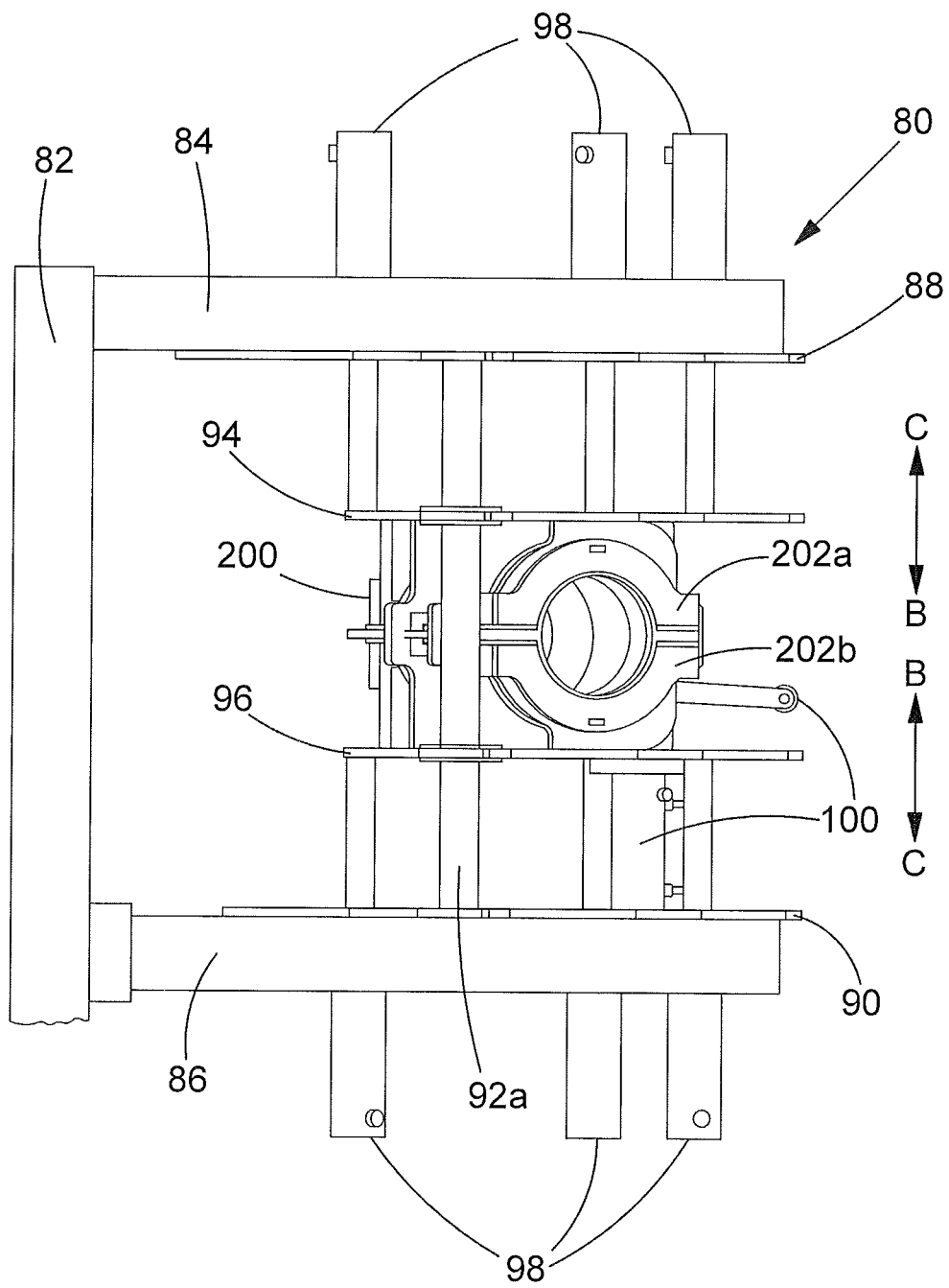
FIG. 3 shows a side elevation view of a mold support frame assembly with a mold.
Figure 4:
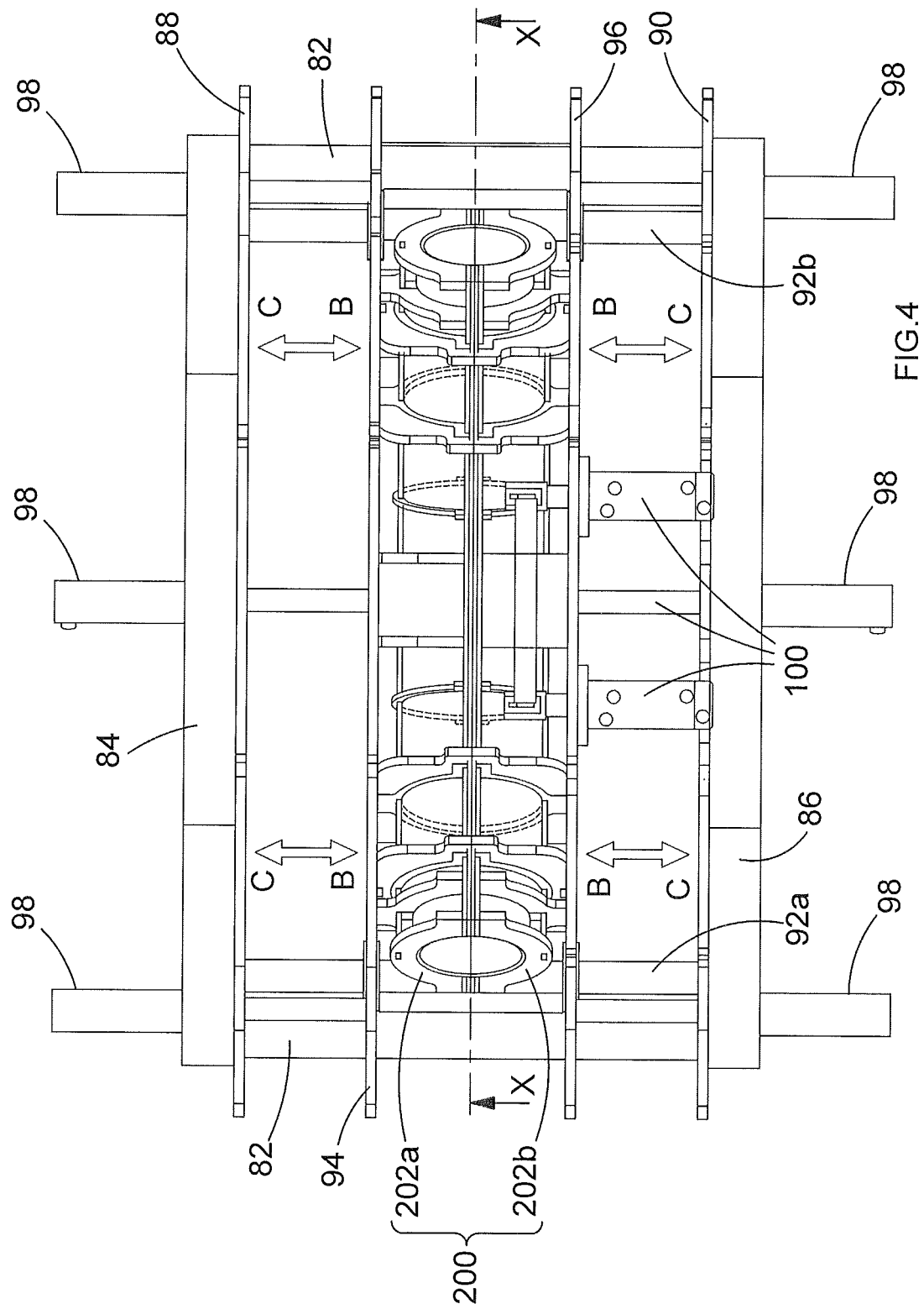
FIG. 4 shows a front elevation view the mold support frame assembly with a mold.
Figure 5:
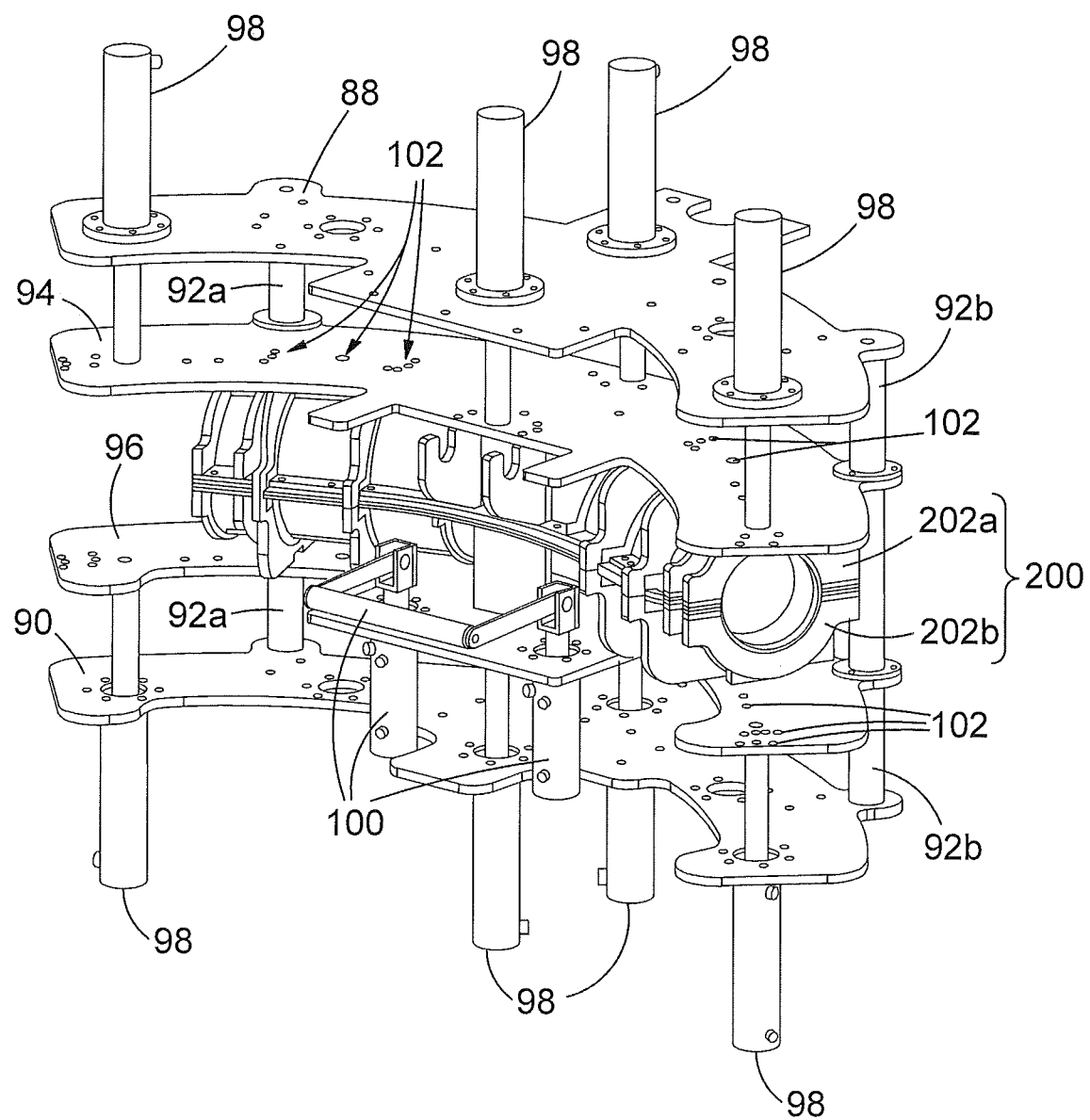
FIG. 5 shows a perspective view of parts of the mold support frame assembly with a mold.

The mold support frame assembly 80 comprises a mold support frame 82 having a generally C-shape when view from one side, as is best shown in FIG. 3. The mold support frame 82 has an upper support arm 84 and a lower support arm 86, both of which are arranged generally horizontal in normal use. An upper support plate 88 is fastened to the underside of the upper support arm 84 and a lower support plate 90 is fastened to the top of the lower support arm 86 facing the upper support plate 88. The upper 88 and lower 90 support plates have a generally arc shape when viewed from above, as is best shown in FIG. 2. A pair of guide rails 92a,92b, both of which are arranged generally vertical in normal use, are connected between the upper 88 and lower 90 support plates. One of the guide rails 92a,92b is on each side of the upper 88 and lower 90 support plates, as is best shown in FIG. 4. The mold support frame assembly 80 further comprises an upper mold plate 94 located directly below the upper support plate 88, a lower mold plate 96 located directly above the lower support plate 90 and an array of hydraulic support frame rams 98. The upper 94 and lower 96 mold plates have a generally arc shape, when viewed from above, with the same arc radius as the shape of the upper 88 and lower 90 support plates. The guide rails 92a,92b guide sliding movement of the upper 94 and lower 96 mold plates in both directions along the guide rails. The support frame rams 98 are configured to force the upper 94 and lower 96 mold plates together (up to a force of about 400 kN), in the direction of arrows B, and retract the upper 94 and lower 96 mold plates apart, in the direction of arrows C. The mold support frame assembly 80 further comprises a manually operable locking arrangement 100 for pulling and hooking the upper 94 and lower 96 mold plates together. The locking arrangement 100 provides additional force to the support frame rams 98.

The upper 88 and lower 90 support plates and the upper 94 and lower 96 mold plates have a generally arc shape to suit a pipeline section mold 200 like that shown in FIGS. 1, 3 and 4. The upper 94 and lower 96 mold plates are perforated with a multitude of fixture holes 102 for fasteners to connect IMPP molds having a range of different arc sweep angles (i.e. 90, 82.9, 45 and 15 degrees) and radii. If an irregular mold has shape that is beyond the range acceptable for fastening to the upper 94 and lower 96 mold plates then these may be replaced by a pair of different mold plates to suit the irregular mold. An example of such an irregular mold would be for coating a T-joint pipeline section or an S-shaped pipeline section.

The pipeline mold 200 comprises an upper shell 202a and a lower shell 202b mating with the upper shell 202a along a central plane CP. The upper shell 202a and the lower shell 202b are, with the exception of minor details, a mirror image of each other about the central plane CP. The upper shell 202a is fastened below the upper mold plate 94 and the lower shell 202b is fastened to the top of the lower mold plate 96. In use, the support frame rams 98 are used to force the upper 202a and lower 202b shells together, in the direction of arrows B, or retract the upper 202a and lower 202b shells, in the direction of arrows C. The upper 202a and lower 202b shells open and close in a generally vertical direction rather than open and close in a pivoting clam shell-style.

The upper 88 and lower 90 support plates, the upper 94 and lower 96 mold plates, the support frame rams 98 and the upper 202a and lower 202b shells (i.e. those components shown in FIG. 5) may be disassembled and replaced so that the IMPP injection molding machine 10 may be used for a wide variety of shapes and sizes of pipeline molds for coating, for example, straight, bent and irregular pipeline sections.

The hydraulic control circuit 110 is housed in a hydraulic valve stand 112 which is mounted upon main support frame 20. An operator working the IMPP injection molding machine 10 may control the control circuit 110 remotely via wired, or wireless, connection. The control circuit 110 provides user-operable control of, amongst other things, the accumulators 62a,62b and the support frame rams 98.

Figure 6A:
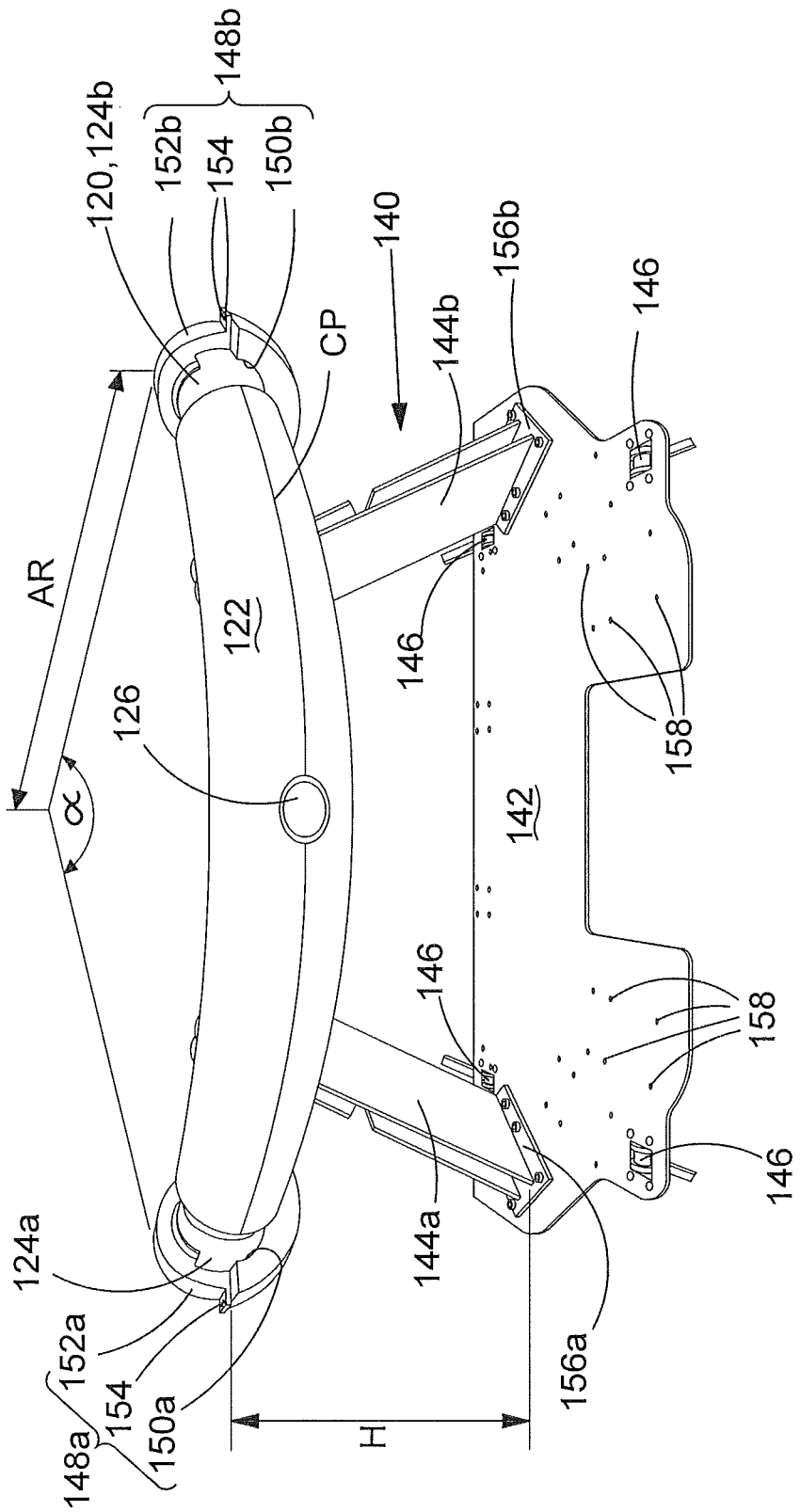
FIG. 6A shows a perspective view of a bent pipeline section coated in polypropylene and supported by a pipeline section stand assembly.
Figure 6B:
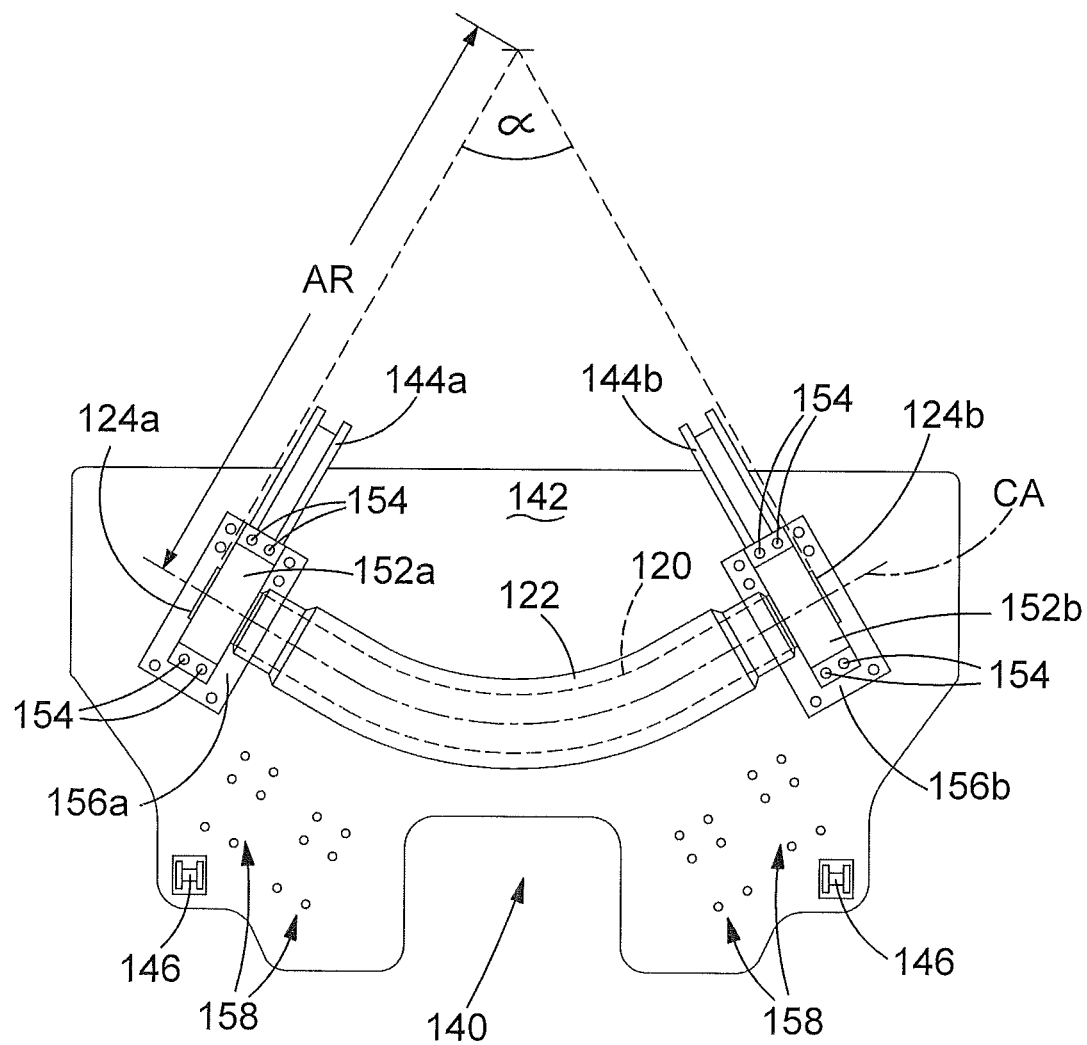
FIG. 6B shows a plan view of the bent pipeline section coated in polypropylene supported by the pipeline section stand assembly shown in FIG. 6B

Referring to FIGS. 6A and 6B, a bent pipeline section 120 coated in a polypropylene coating 122 is supported at each end 124a, 124b of the bent pipeline section 120 by a pipeline section stand 140 comprising a stand base 142 and a pair of stand arms 144a, 144b extending up from the stand base 142. The bent pipeline section 120 shown is carbon steel for use in oil and gas pipelines with a wall thickness of 12.7 mm and an outside diameter of 209 mm. The thickness of the polypropylene coating 122 may be in the range of, but not limited to, 25 mm to 75 mm. The bent pipeline section 120 is bent in an arc having a sweep angle α of 82.9 degrees and an arc radius AR of approximately five times greater than the outside diameter of the bent pipeline section.

The stand base 142 has flanged wheels 146 arranged to run along rails R in a factory floor so that the pipeline section stand 140 may be maneuvered in a controlled and accurate manner in relation to the mold support assembly 80 in both the directions of double-headed arrow A. The top of each stand arm 144a, 144b has a clamping collar 148a,148b which is clamped around an end 124a, 124b of the bent pipeline section 120. Each clamping collar 148a, 148b comprises a hemi-cylindrical face 150a,150b formed in the top of a respective stand arm 144*a*,144*b*. Each clamping collar 148*a*, 148*b* further comprises a hemi-cylindrical bracket 152*a*, 152*b* detachably fastened by bolts 154 to its respective stand arm 144*a*,144*b* and facing its respective hemi-cylindrical face 150*a*,150*b*. PTFE (Polytetrafluoroethylene) tape, strips or thin bar may be used to help the clamping collars 148*a*, 148*b* grip the ends 124*a*,124*b* of the bent pipeline section 120.

The bent pipeline section 120 has a curved central axis CA which follows a curved path through the tubular centre of the bent pipeline section 120. When the bent pipeline section 120 is inside the bent pipeline mold 200 the central axis CA is in the central plane CP between the upper 202*a* and lower 202*b* shells.

The central axis of the first clamping collar 148*a* is tangential to the central axis CA of the bent pipeline section 120 at the first end 124*a* thereof and the central axis of the second clamping collar 148*b* is tangential to the central axis CA of the bent pipeline section 120 at the second end 124*b* thereof opposite to the first end 124*a*. The central axes of the first 148*a* and second 148*b* clamping collars are non-parallel and co-planar with the central plane CP of the pipeline section mold 200. Thus, the first 148*a* and second 148*b* clamping collars hold the bent pipeline section 120 with its central axis CA in the central plane CP of the mold 200 without need for support between the ends 144*a*, 144*b* of the bent pipeline section 120.

The bottom of each stand arm 144*a*, 144*b* has a foot 156*a*, 156*b* which is fastened to the stand base 142. The stand base 142 is perforated with a multitude of fixture holes 158 for fasteners to connect the stand arms 144*a*, 144*b* to bent pipeline sections having a range of different arc sweep angles α (i.e. angle α=90, 82.9, 45 or 15 degrees) and radii AR.

The bent pipeline section 120 shown in FIGS. 6A and 6B has already been coated in the polypropylene coating 122 by the mold 200 injected with molten polypropylene by the IMPP injection molding machine 10. The bent pipeline stand assembly 140 holds the bent pipeline section 120 at a height H from the stand base 142 while the bent pipeline section 120 is being moved into the mold 200 before the injection molding process. The pipeline section stand assembly 140 holds the bent pipeline section 120 firmly and accurately in the central plane CP in the mold 200 during the injection molding process. Also, the pipeline section stand assembly 140 holds the bent pipeline section 120 after the injection molding process when it has been released from the mold 200 to cool and properly solidify.

The upper 202*a* and lower 202*b* shells of the pipeline section mold 200 are substantially a mirror image of each other about the central plane CP which divides the upper 202*a* and lower 202*b* shells. The construction of the upper shell 202*a* shall be described, it being understood that this description applies equally to the lower shell 202*b* in all but very minor details.

A distinct advantage of the construction of the pipeline section mold 200 is its versatility for use with different shapes and sizes of polypropylene coating and pipeline sections.

Referring to FIGS. 7A to 10 and 17, the upper shell 202*a* comprises an impervious shell body 220 made of glass-fiber reinforced plastic (hereinafter referred to as GFRP) clad with an exoskeleton 240 made of steel for its reinforcement, stability and non-distensible properties. The shell body 220 is fabricated from glass-fiber matting layered over a master template 300 and bonded together by a high temperature epoxy resin and accelerator. The exoskeleton 240 is fabricated from laser-cut steel parts which are assembled, interlocked and welded together. Epoxy resins capable of withstanding temperatures up to, and in excess of 200° centigrade are commercially available and are not discussed in any more detail.

The shape of the inside face 204 of the upper shell 202*a* is defined by a master template 300. The pipeline section mold 200 and the master template 300 each have a curved central axis which follows the same curved path as the curved central axis CA of the bent pipeline section 120. For simplicity, the central axis of the pipeline section mold 200 and the master template 300 shall hereon be referred to as the central axis CA.

The master template 300 is constructed from a multitude of inter-connectable parts of varying shapes and sizes according to the shape and size of the inside face of the shell body 220. In the example shown, the master template 300 is constructed from a base template 302 supporting an array of wooden semi-circular discs 304, 306, 308, 310, 314 interconnected by a wooden curved wall 316 made of plywood or another suitably workable type of wood. The array of semi-circular discs 304, 306, 308, 310, 314 is laid with the discs' flat faces on a flat recessed part 318 of the base template 302. The central axes of semi-circular discs 304, 306, 308, 310, 314 are arranged tangential to the curved central axis CA and the discs' flat faces are coplanar with the central plane CP of the pipeline section mold 200. The curved wall 316 follows the path of the curved central axis CA.

The wooden semi-circular discs 304, 306, 308, 310, 314 are positioned along the array according to the thickness of polypropylene coating 122 to be applied to the bent pipeline section 120 at certain places along the central axis CA. Likewise, the height of the curved wall 316 (from the recessed part 318 of the base template 302) varies according to the thickness of polypropylene coating 122 to be applied to the bent pipeline section 120 at certain places along the central axis CA. The outline 320 of the flat recessed part 318 of the base template 302 corresponds to the outer rims 222*l*, 222*s* of the shell body 220. The base template 302 is made from wood and the recessed part 318 is cut from the wood with a router or other machining tool.

Major diameter semi-circular discs 304 are arranged along the middle approximately 80 percent of the central axis CA at intervals of approximately 100 mm to 200 mm. The major diameter semi-circular discs 304 correspond to a main section 206 of the pipeline section mold 200 where the polypropylene coating 122 is thickest.

Minor diameter semi-circular discs 306 are arranged along the final approximately two percent of the central axis CA at the end of the pipeline section mold 200. Since this is a small length of pipeline mold, one minor diameter semi-circular disc 306 at each end of this part of the central axis CA is sufficient. The minor diameter semi-circular discs 306 correspond to a sealed section 208 of the pipeline section mold 200 which has the outside diameter of the ends 124*a*, 124*b* of the bent pipeline section 120 and which is sealed from polypropylene coating.

Median diameter semi-circular discs 308 are arranged along approximately eight percent of the central axis CA of the pipeline section mold 200 inside where the minor diameter semi-circular discs 306 are arranged. Since this is a small length of pipeline mold, a median diameter semi-circular disc 308 at each end of this part of the central axis CA is sufficient. The median diameter semi-circular discs 308 correspond to a restricted section 210 of the pipeline section mold 200 where the polypropylene coating 122 is thinnest.

A chamfered semi-circular disc 310 is arranged at a transition between a major semi-circular disc 304 and a median semi-circular disc 308 near each end of the central axis CA. Each chamfered semi-circular disc 310 tapers from the diameter of the adjacent major semi-circular disc 304 to the diameter of the adjacent median semi-circular disc 308 with a smooth conical face 312. The chamfered semi-circular disc 310 provides a conical section 212 of the pipeline section mold 200 where molten polypropylene destined for the restricted section 210 may pass smoothly. This helps to prevent, or at least minimize, voids in the restricted section's polypropylene coating 122.

An infill semi-circular disc 314 is arranged at the midpoint of the longer side 206l of the main section 206 of the pipeline section mold 200. The infill semi-circular disc 314 corresponds to an infill section 214 of the pipeline section mold 200 at the point where the accumulator delivery pipe 70 is connected and molten polypropylene is injected into the pipeline section mold 200 from the IMPP injector machine 10.

The semi-circular discs 304, 306, 308, 310, 314 and the curved wall 316 of the master template 300 may be re-used to make multiple pipeline section molds 200 having the same basic shape. The number and shape of the semi-circular discs 304, 306, 308, 310, 314, the curved wall 316 and the shape of the base template 302 may be changed to make a new master template for making different molds capable of producing polypropylene coatings having different outer shapes and thickness to suit different pipeline sections used for different purposes. Alternatively, the semi-circular discs 304, 306, 308, 310, 314 may be substituted by a solid master template made of plastics material or GFRP.

The shell body 220 is fabricated with multiple sheets of glass-fiber matting, high temperature epoxy resin and accelerator layered over the master template 300. First, the array of semi-circular discs 304, 306, 308, 310, 314 and the curved wall 316 are located in the recessed part 318 of the base template 302. Next, the interstices between the array of semi-circular discs 304, 306, 308, 310, 314 and the curved wall 316 are filled with high density foam and then shaped with a smooth finish primer. This is to prevent the shell body 220 from sagging into interstices between the semi-circular discs 304, 306, 308, 310, 314.

Figure 8:
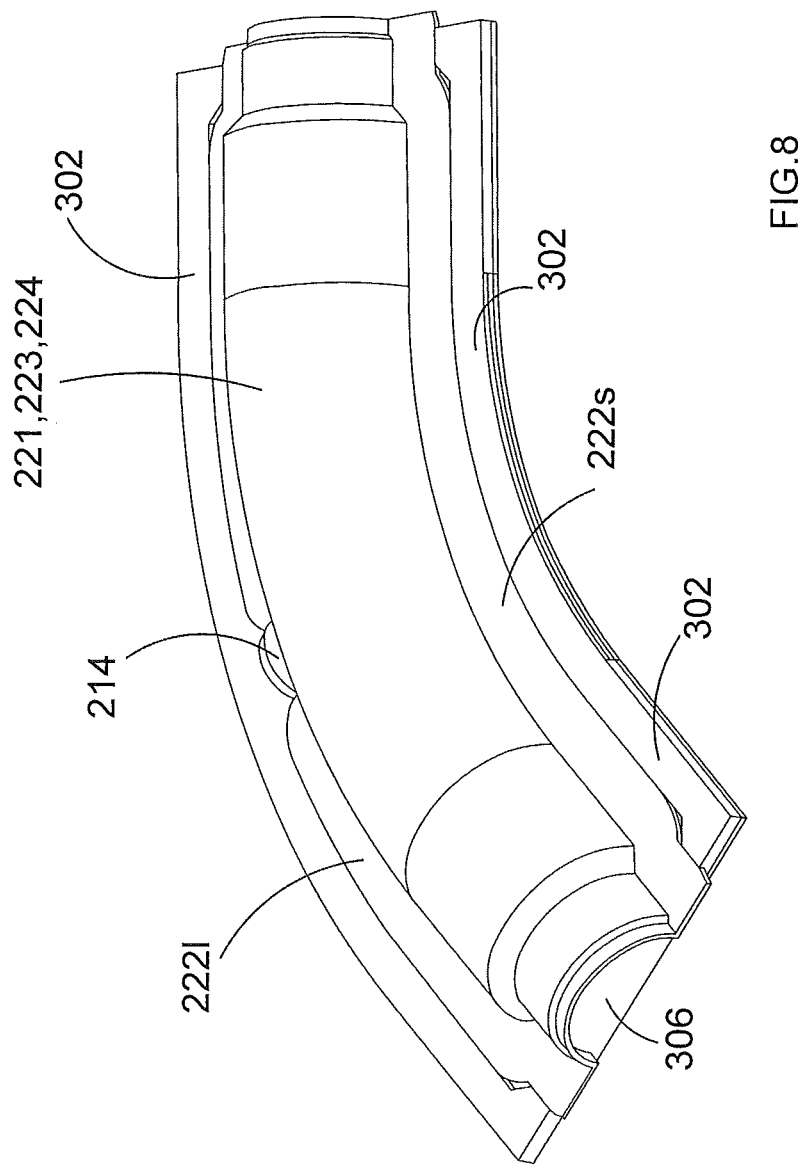
FIG. 8 shows a perspective view of the mater template of FIG. 7A clad with layers of glass-fiber matting, high temperature epoxy resin and accelerators.

Referring to FIG. 8, glass-fiber matting 221 and high temperature epoxy resin with accelerator 223 are laid in an initial base layer 224 of approximately 8 mm thick over the array of semi-circular discs 304, 306, 308, 310, 314 and the curved wall 316. The recessed parts 318 of the base template 302 not occupied by the array of circular discs 304, 406, 308, 310, 314 receive glass-fiber matting 221 and high temperature epoxy resin with accelerator 223 approximately 8 mm thick. This forms a rim 222l, 222s of approximately 30 mm to 50 mm wide along each of the longer 202al and shorter 202as sides of the upper shell 202a, respectively, which is also part of the initial base layer 224.

Figure 9:
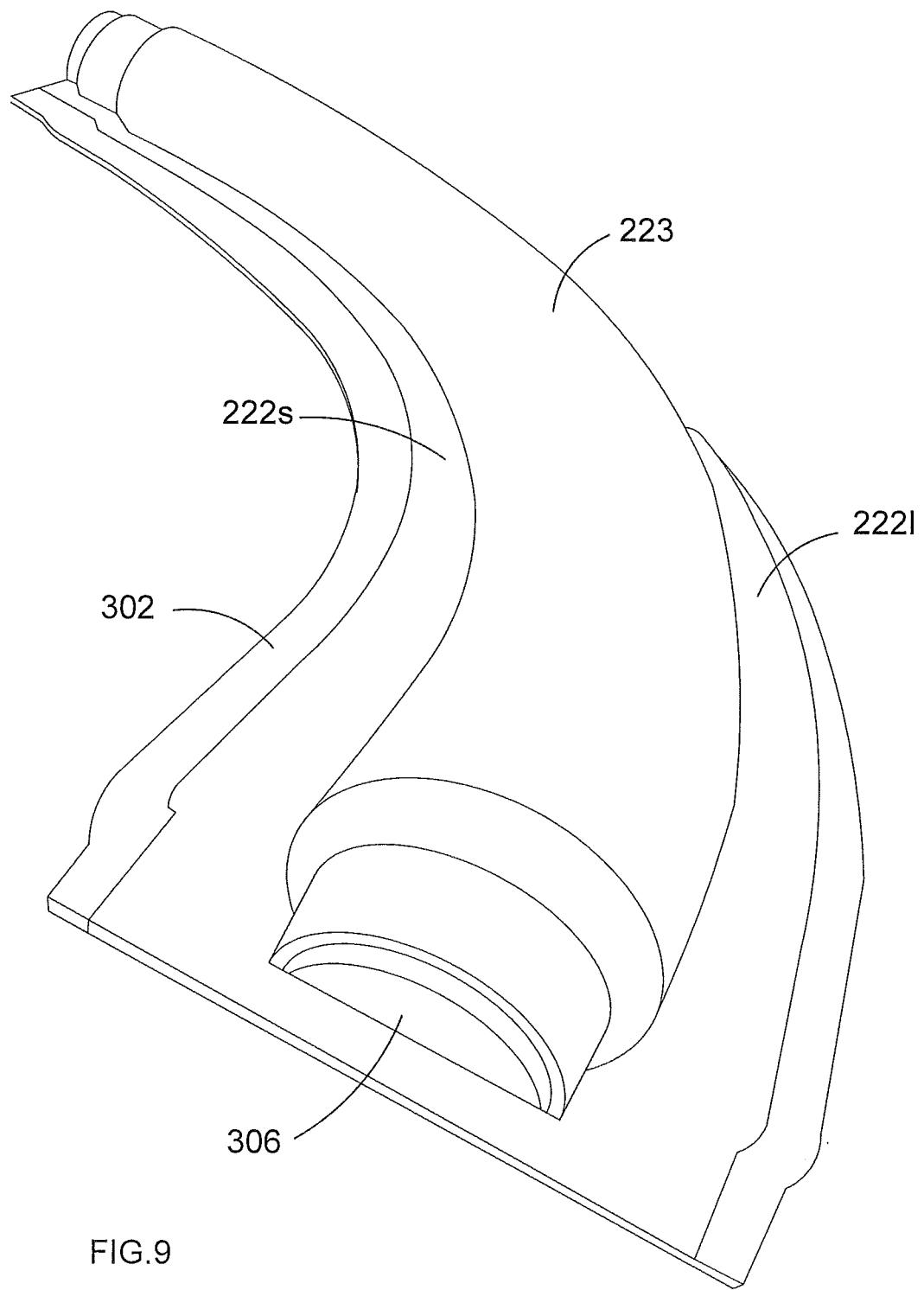
FIG. 9 shows a perspective view of the glass-fiber matting of FIG. 8 covered in additional high temperature epoxy resin.

Referring to FIG. 9, the base layer 224 of glass-fiber matting 221 and high temperature epoxy resin with accelerator 223 is covered in additional epoxy resin with accelerator 223. The exoskeleton 240 is partially embedded into the base layer 224 of glass-fiber matting while the epoxy resin is still soft so that the exoskeleton 240 adheres firmly to base layer 224 once the epoxy resin is set.

Figure 10:
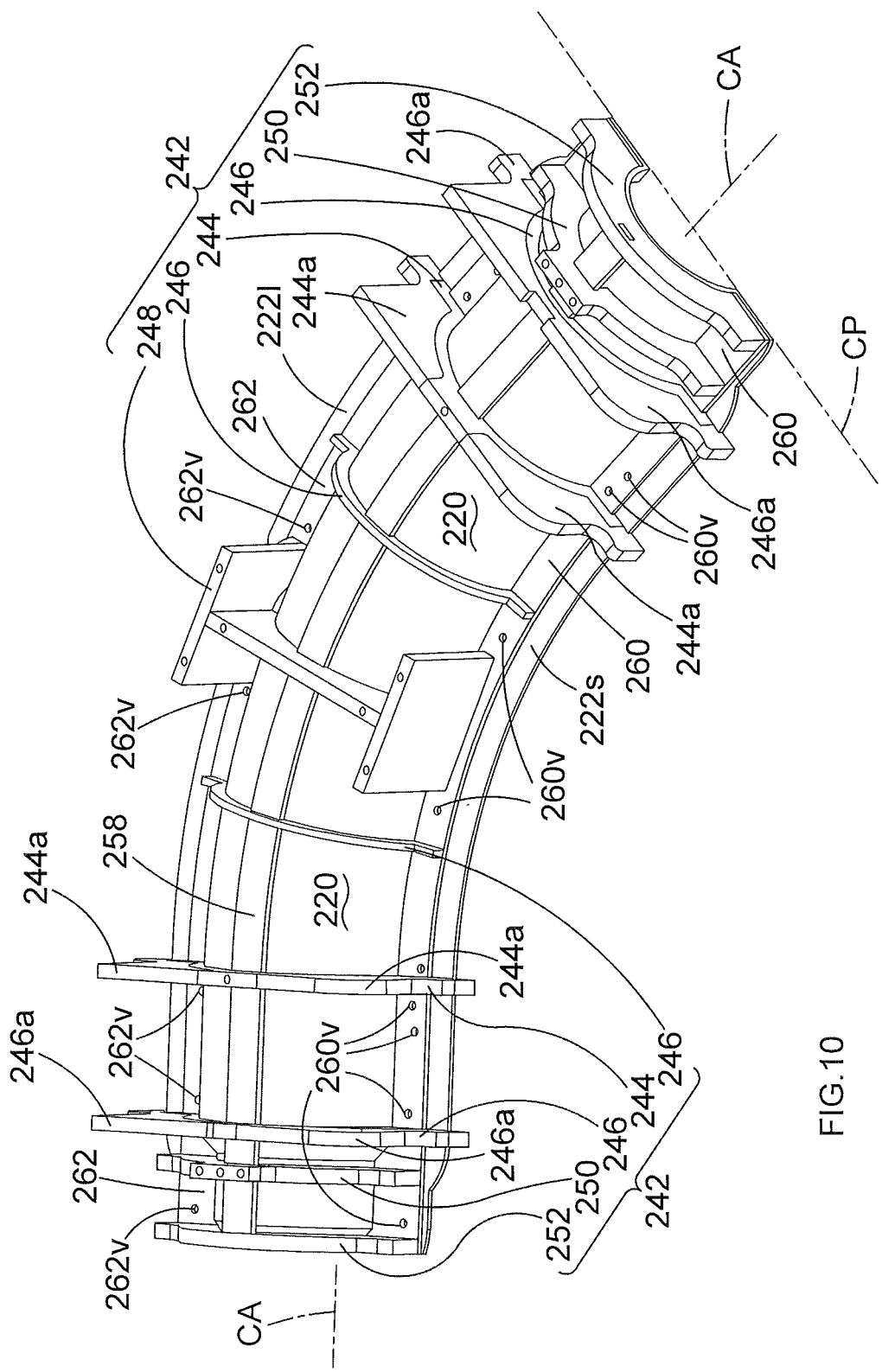
FIG. 10 shows a perspective view of an upper shell of the mold in FIG. 4.

Referring to FIG. 10, the exoskeleton 240 is constructed from an array 342 of steel profiled sections 244, 246, 248, 250, 252 arranged at various stages along the length of the pipeline section mold 200. The profiled sections 244, 246, 248, 250, 252 have inner hemi-cylindrical faces the axes of which are arranged tangential to the curved central axis CA of the pipeline section mold 200. The profiled sections 244, 246, 248, 250, 252 are connected to a steel curved spine 258 that extends along the length of the exoskeleton 240 in line with the central axis CA of the pipeline section mold 200. Also, these profiled sections 244, 246, 248, 250, 252 are connected to a steel curved inner rim 260 and a steel curved outer rim 262 which extend along the length of the exoskeleton 240 on the shorter side 202as and the longer side 202al of the upper shell 202a, respectively. The profiled sections 244, 246, 248, 250, 252 have lower flat faces which are parallel to the central plane CP of the pipeline section mold 200.

Figure 11:
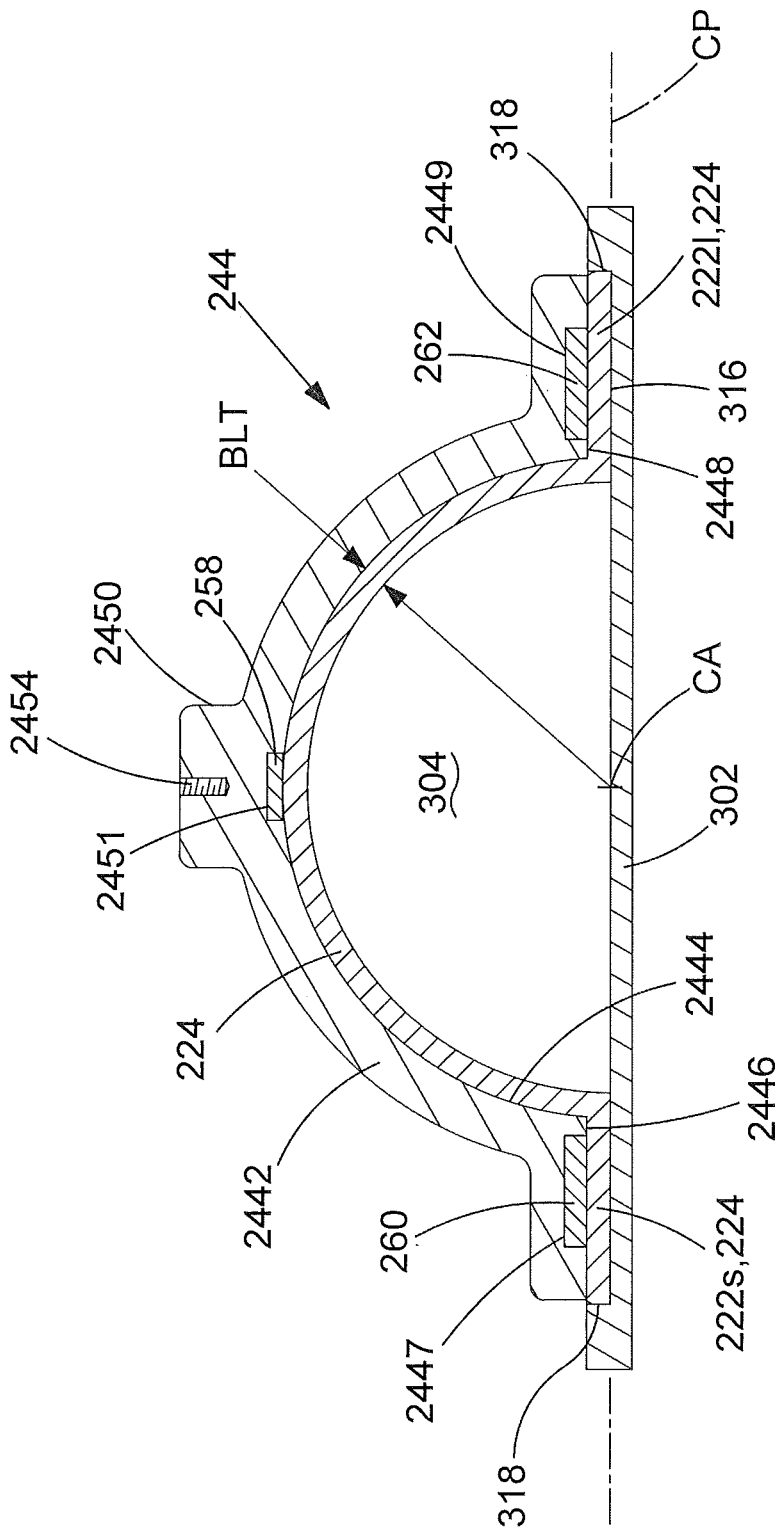
FIG. 11 shows a vertical cross-sectional view of a thick major profile section.

Referring in particular to FIG. 11, a thick major profiled section 244 comprises an arch 2442 with an inner hemi-cylindrical face 2444 centered on the central axis CA, a lower flat face 2446,2448 at each end of the arch 2442 arranged parallel to the central plane CP, and a head piece 2450 at the apex of the arch 2442. One lower flat face 2446 has a rebate 2447 which accommodates the curved inner rim 260 and the other lower flat face 2448 has a rebate 2449 which accommodates the curved outer rim 262. The inner hemi-cylindrical face 2444, at the head piece 2450, has a rebate 2451 which accommodates the curved spine 258. The curved inner rim 260, the curved outer rim 262 and the curved spine 258 are welded to the thick major profiled section 244 at the lower flat face 2446, the lower flat face 2448 and the head piece 2450, respectively. The head piece 2450 comprises a blind threaded bore 2454 for receiving a threaded fastener F. The blind threaded bore 2454 acts as a pick-up point for connecting the upper shell 202a to the upper mold plate 94 with said fastener F. The difference in the radius of the inner hemi-cylindrical face 2444 and the radius of the next major semi-circular disc 302 (either within the inner hemi-cylindrical face 2444 or adjacent thereto) is the same as the approximately 8 mm thickness BLT of the base layer 224 of glass-fiber matting and epoxy resin. The thick major profiled section 244 is laser cut, for precision, from steel 20 mm thick to provide extra strength to the thick major profiled section 244 with enough thickness to accommodate the blind threaded bore 2454. The inner hemi-cylindrical face 2444 is partially embedded into the base layer 224 of glass-fiber matting while the epoxy resin is still soft to help key the thick major profiled section 244 into the base layer 224 once the epoxy resin has cured.

Figure 12:
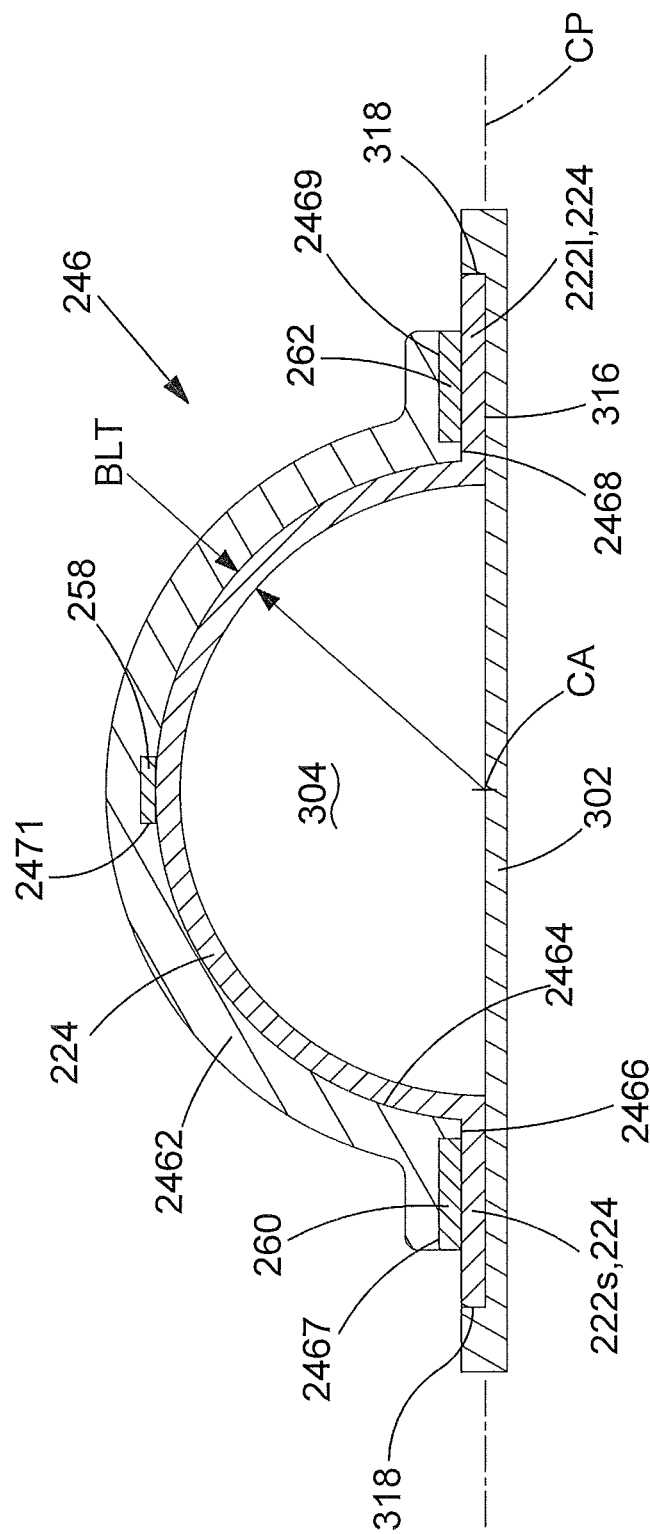
FIG. 12 shows a vertical cross-sectional view of a thin major profile section.

Referring in particular to FIG. 12, a thin major profiled section 246 comprises an arch 2462 with an inner hemi-cylindrical face 2464 centered on the central axis CA and a lower flat face 2466, 2468 at each end of the arch 2462 arranged parallel to the central plane CP. One lower flat face 2466 has a rebate 2467 which accommodates the curved inner rim 260 and the other lower flat face 2468 has a rebate 2469 which accommodates the curved outer rim 262. The apex of the inner hemi-cylindrical face 2464 has a rebate 2471 which accommodates the curved spine 258. The curved inner rim 260, the curved outer rim 262 and the curved spine 258 are welded to the thin major profiled section 246 at the lower flat face 2466, lower flat face 2468 and the apex of the apex of the arch 2462, respectively. The difference in the radius of the inner hemi-cylindrical face 2464 and the radius of the next major semi-circular disc 304 (either within the inner hemi-cylindrical face 2464 or adjacent thereto) is the same as the approximately 8 mm thickness BLT of the base layer 224 of glass-fiber matting and epoxy resin. The thin major profiled section 246 is laser cut, for precision, from steel 10 mm thick. The inner hemi-cylindrical face 2444 is partially embedded into the base layer 224 of glass-fiber matting while the epoxy resin is still soft.

Figure 13:
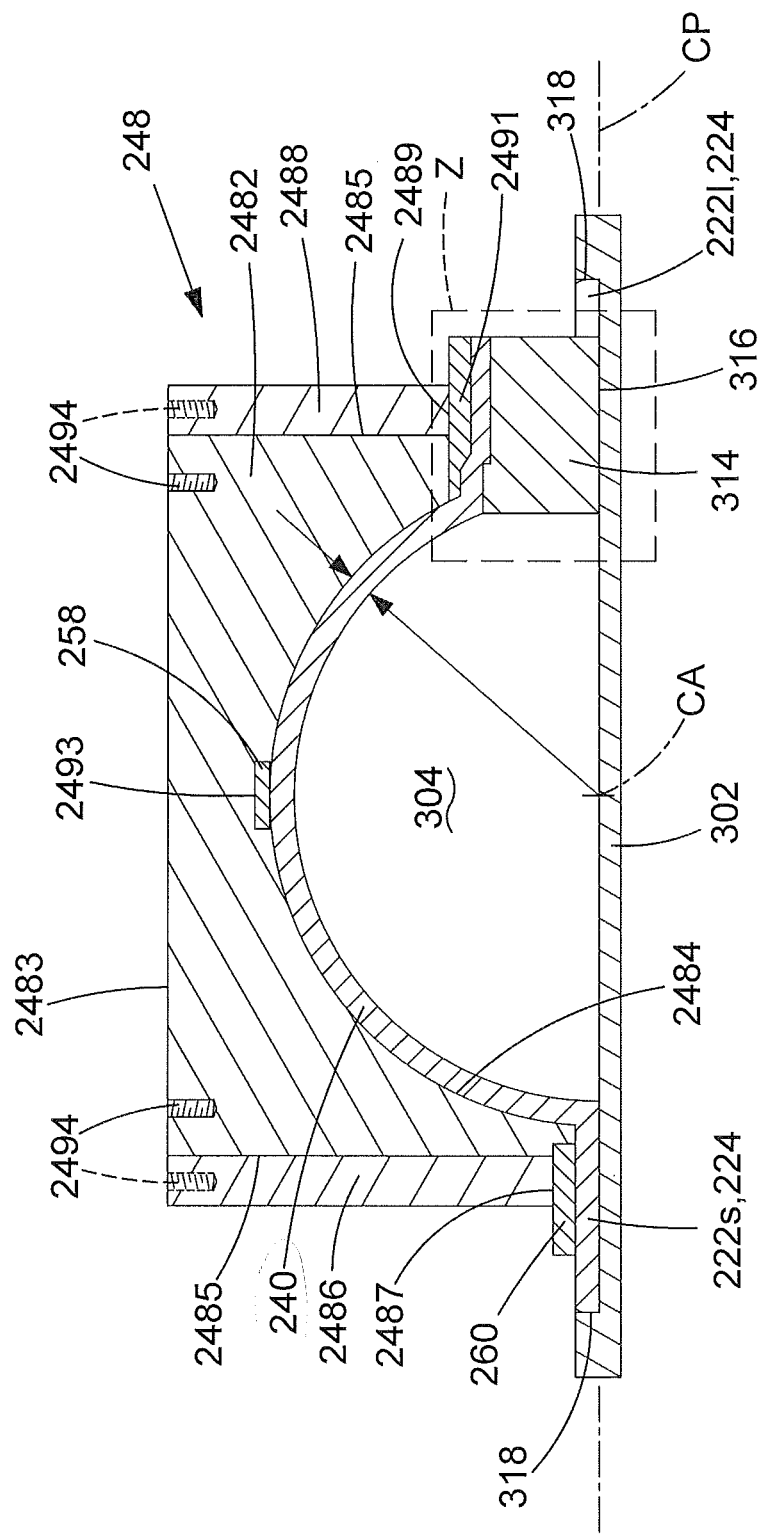
FIG. 13 shows a vertical cross-sectional view of an H-shaped major profile section.
Figure 14:
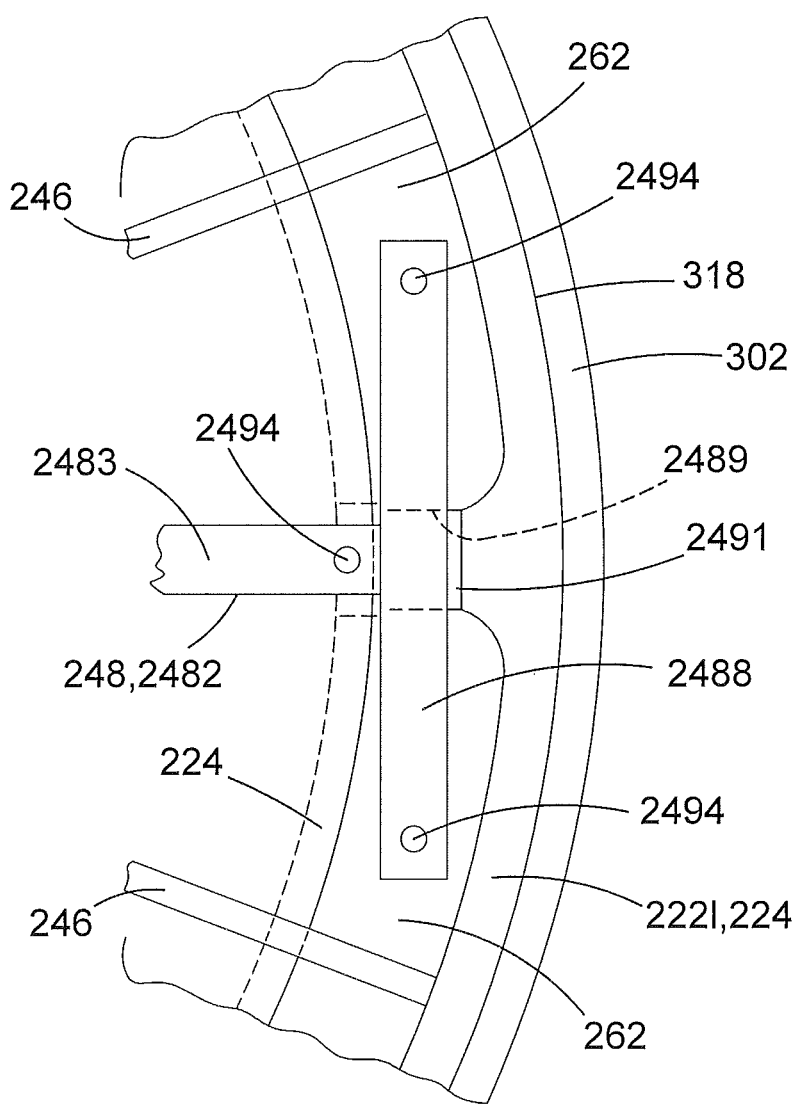
FIG. 14 shows a plan view of detail Z in FIG. 13.

Referring in particular to FIGS. 13 and 14, an H-shaped major profiled section 248 comprises an arch 2482 with a flat top face 2483 and an inner hemi-cylindrical face 2484 centered on the central axis CA, a side wall 2486, 2488 welded to each side face 2485 of the arch 2482 and arranged perpendicular to the arch 2482 thereby giving the H-shaped major profiled section 248 an H-shape when viewed from above the upper shell 202a. A rebate 2487 below one side wall 2486 and the arch 2482 accommodates the curved inner rim 260. A rebate 2489 below the other side wall 2488 and the arch 2482 accommodates a hemi-cylindrical profiled section 2491 around the infill semi-circular disc 314 with about 8 mm spare to form the infill section 214 of the initial base layer 224 located therebetween. The apex of the inner hemi-cylindrical face 2484 has a rebate 2493 which accommodates the curved spine 258. The curved inner rim 260 is welded to bottom of a region between the arch 2482 and one side wall 2486. The curved spine 258 is welded to the arch 2482. A break in the curved outer rim 262 is bridged by the other side wall 2488 which is welded to both parts of the curved outer rim 262, as is best shown by FIG. 14. The arch 2482 and both side walls 2486, 2488 comprise blind threaded bores 2494 for receiving a respective threaded fastener F. The blind threaded bores 2494 acts as pick-up points for connecting the upper shell 202a to the upper mold plate 94 with said fasteners F. The difference in the radius of the inner hemi-cylindrical face 2484 and the radius of the next adjacent major semi-circular disc 302 is the same as the approximately 8 mm thickness BLT of the base layer 224 of glass-fiber matting and epoxy resin. The components of the thick major profiled section 244 are laser cut, for precision, from steel 20 mm thick. The inner hemi-cylindrical face 2484 is partially embedded into the base layer 224 of glass-fiber matting while the epoxy resin is still soft to help key the H-shaped major profiled section 248 into the base layer 224 once the epoxy resin has cured.

Figure 15:
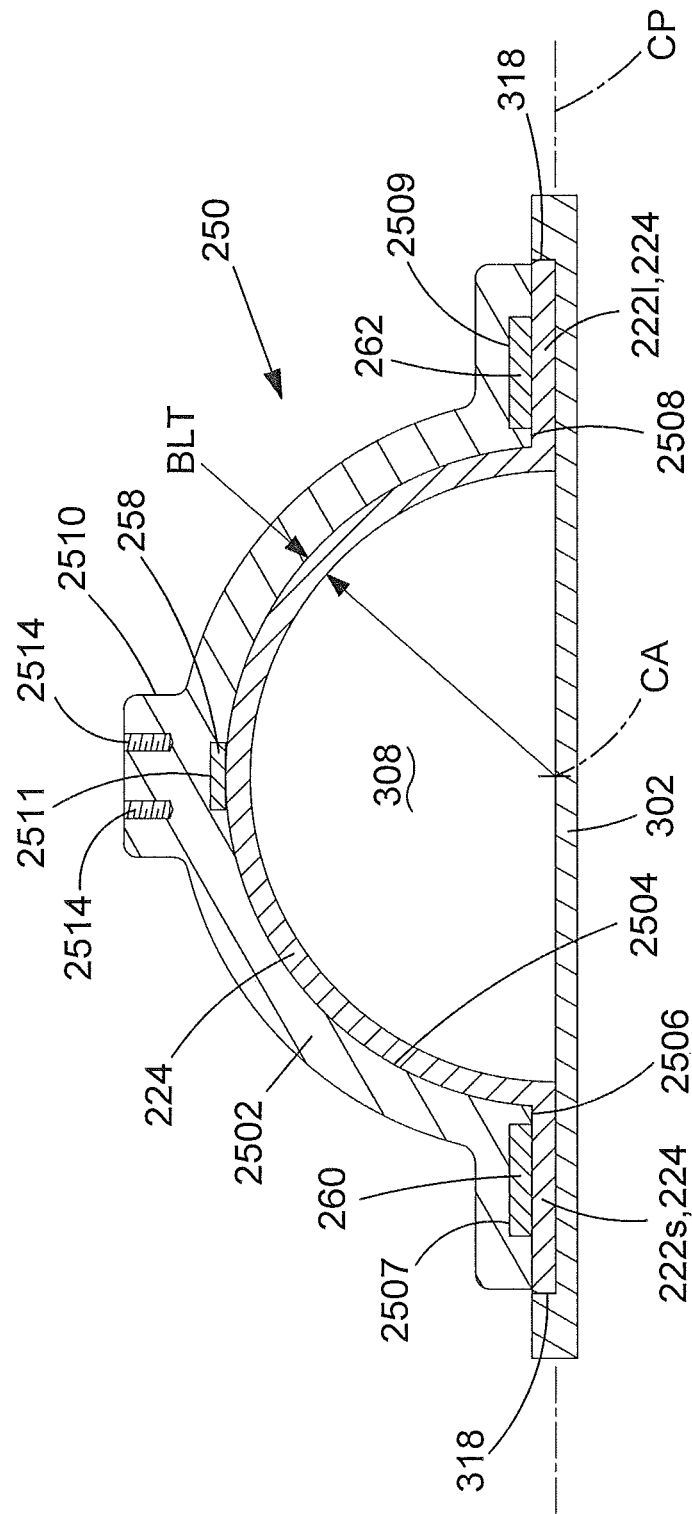
FIG. 15 shows a vertical cross-sectional view of a thick median profile section.

Referring in particular to FIG. 15, a thick median profiled section 250 comprises an arch 2502 with an inner hemi-cylindrical face 2504 centered on the central axis CA, a lower flat face 2506, 2508 at each end of the arch 2502 arranged parallel to the central plane CP, and a head piece 2510 at the apex of the arch 2502. One lower flat face 2506 has a rebate 2507 which accommodates the curved inner rim 260 and the other lower flat face 2508 has a rebate 2509 which accommodates the curved outer rim 262. The head piece 2510 part of the hemi-cylindrical face 2504 has a rebate 2511 which accommodates the curved spine 258. The curved inner rim 260, the curved outer rim 262 and the curved spine 258 are welded to the thick median profiled section 250 at the lower flat face 2506, lower flat face 2508 and head piece 2510, respectively. The head piece 2510 comprises a pair of blind threaded bores 2514 for receiving a respective threaded fastener F. The blind threaded bores 2514 act as a pick-up points for connecting the upper shell 202a to the upper mold plate 94 with said fastener F. The difference in the radius of the inner hemi-cylindrical face 2504 and the radius of the median semi-circular disc 308 (either within the inner hemi-cylindrical face 2504 or adjacent thereto) is the same as the approximately 8 mm thickness BLT of the base layer 224 of glass-fiber matting and epoxy resin. The thick median profiled section 250 is laser cut, for precision, from steel 20 mm thick. The inner hemi-cylindrical face 2504 is partially embedded into the base layer 224 of glass-fiber matting while the epoxy resin is still soft to help key the thick median profiled section 250 into the base layer 224 once the epoxy resin has cured.

Figure 16:
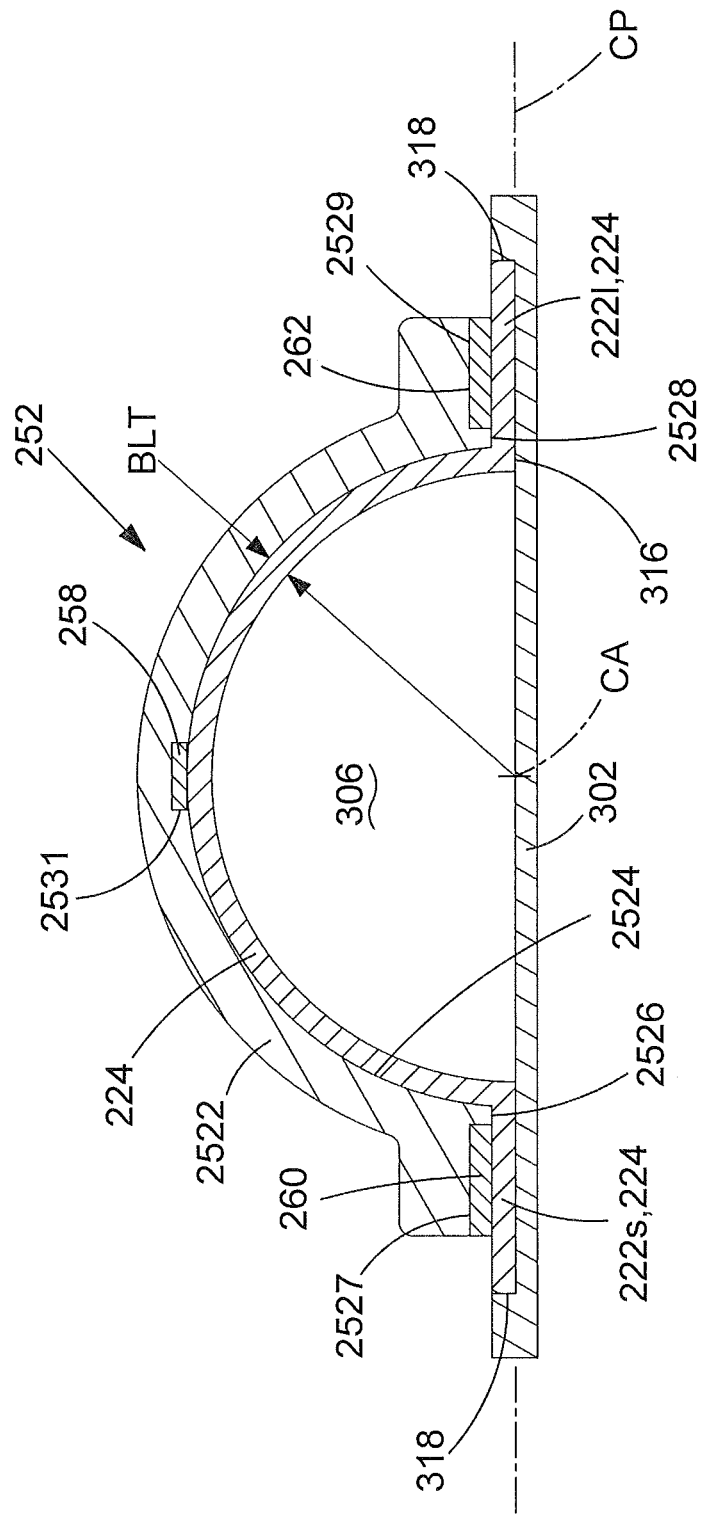
FIG. 16 shows a vertical cross-sectional view of a thin minor profiles section.

Referring in particular to FIG. 16, a thin minor profiled section 252 comprises an arch 2522 with an inner hemi-cylindrical face 2524 centered on the central axis CA and a lower flat face 2526, 2528 at each end of the arch 2522 arranged parallel to the central plane CP. One lower flat face 2526 has a rebate 2527 which accommodates the curved inner rim 260 and the other lower flat face 2528 has a rebate 2529 which accommodates the curved outer rim 262. The apex of the inner hemi-cylindrical face 2524 has a rebate 2531 which accommodates the curved spine 258. The curved inner rim 260, the curved outer rim 262 and the curved spine 258 are welded to the thin minor profiled section 252 at the lower flat face 2526, lower flat face 2528 and the arch 2522, respectively. The difference in the radius of the inner hemi-cylindrical face 2524 and the radius of the minor semi-circular disc 306 is the same as the approximately 8 mm thickness BLT of the base layer 224 of glass-fiber matting and epoxy resin. The thin minor profiled section 252 is laser cut, for precision, from steel 10 mm thick. The inner hemi-cylindrical face 2524 is partially embedded into the base layer 224 of glass-fiber matting while the epoxy resin is still soft. The thin minor profiled section 252 is relatively thin to help avoid air pockets while at the same time helping to key the thin minor profiled section 252 into the base layer 224 once the epoxy resin is set.

Figure 17:
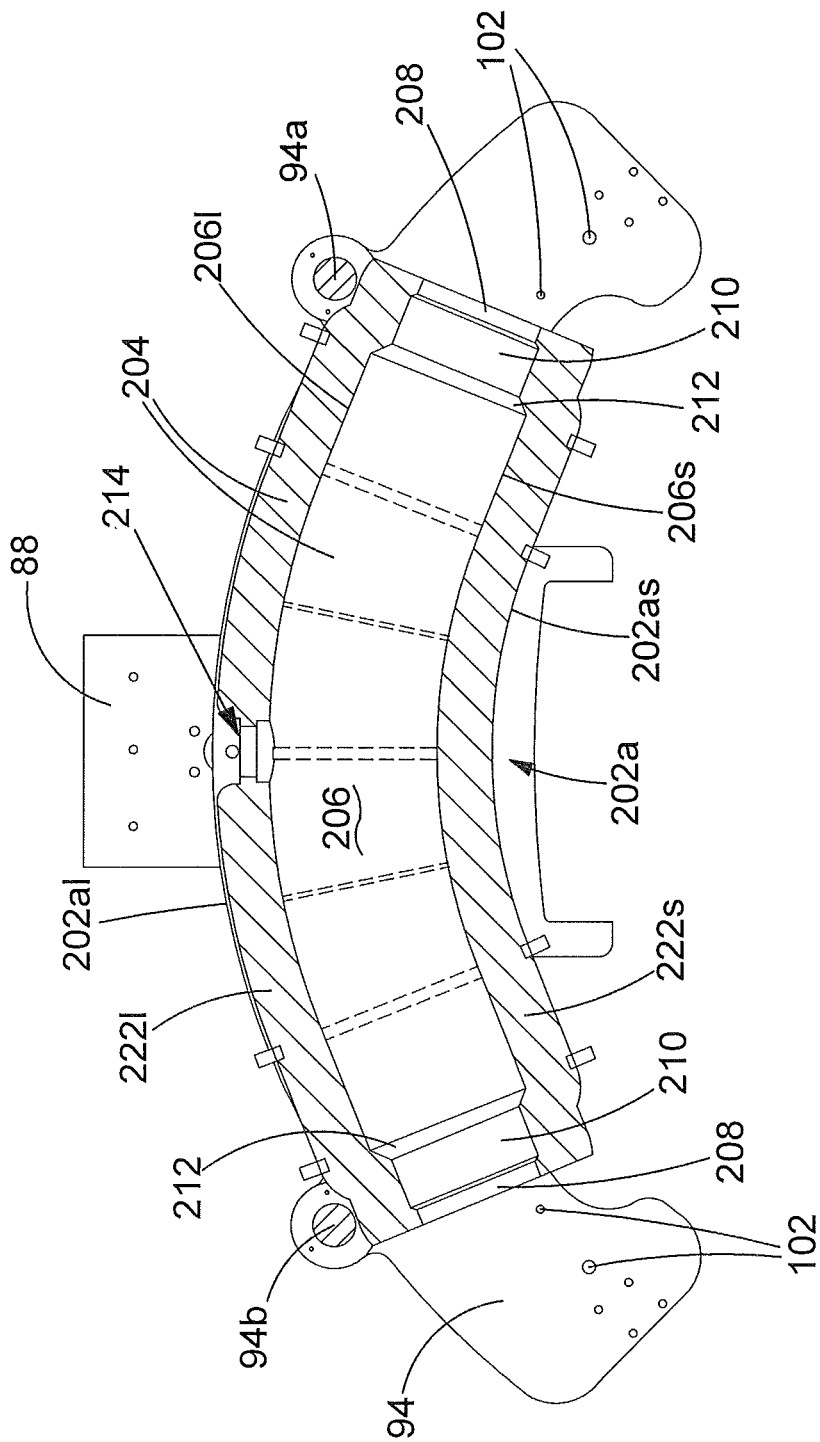
FIG. 17 shows a horizontal cross-sectional view X-X of the mold in FIG. 4.

Referring in particular to FIGS. 10 and 17, the parts of the exoskeleton 240 are interlocked and welded together with a thin minor profiled section 252 at each extreme end of the central axis CA where the sealed section 208 of the upper shell 202a is located. Going inwards along the central axis CA from the thin minor profiled section 252, a thick median profiled section 250 is next to each thin minor profiled section 252 where the restricted section 210 meets the conical section 212 of the upper shell 202a. Next, a thin major profiled section 246 is next to each thick median profiled section 250 where the conical section 212 meets the main section 206 of the upper shell 202a. The thin major profiled section 246 is clad with a shoulder 246a on each side of the central axis CA to provide additional support when connected to the upper mold plate 94. Next, a thick major profiled section 244 and then another thin major profiled section 246 are arranged between the thin major profiled sections 246 and the H-shaped major profiled section 248. The thick major profiled section 244 is clad with a shoulder 244a on each side of the central axis CA to provide additional support when connected to the upper mold plate 94. At the midpoint along the central axis is the H-shaped major profiled section 248. The profiled sections 244, 246, 248, 250, 252, the curved spine 258, the curved inner rim 260 and the curved outer rim 262 respectively, are embedded into the base layer 224 while the epoxy resin remains soft. Vents 260v, 262v through the curved inner rim 260 and the curved outer rim 262 permit passage of epoxy resin to help key the exoskeleton into the base layer 224.

Fabrication of the shell body 220 continues. A reinforcement layer 226 of glass-fiber matting 221 and high temperature epoxy resin with accelerator 223 are layered up to approximately 20 mm thick over the base layer 224 and the exoskeleton 240 (with the exception of the top faces of the profiled sections). Many of those parts of the exoskeleton that are spared the reinforcement layer 226 are used as connection points to the upper 94 and the lower 96 mold plates of the mold support assembly. The reinforcement layer 226 of matting of glass-fiber matting 221 and high temperature epoxy resin with accelerator 223 provides the shell body with additional strength. The overall thickness of the base 224 and reinforcement 226 layers of glass-fiber matting 221 and high temperature epoxy resin with accelerator 223 is up to approximately 28 mm.

When the resin has completely has cured, the upper 202a and lower 202b shells can withstand molten polypropylene of up to 200 degrees centigrade. The exoskeleton 240 embedded into glass-fiber matting 221 and epoxy resin 223 of the base 224 and reinforcement 226 layers adds considerable strength and accuracy to the upper 202a and lower 202b shells. This results in a pipeline section mold 200 which is capable of withstanding a pressure generated by the IMPP injection molding machine 10 of up to 200 bar (20,000,000 Pa). Also, the construction of the upper 202a and lower 202b shells provides a lighter and cheaper pipeline section mold 200 than can be made from solid steel. The construction of the upper 202a and lower 202b shells is quicker than casting and machining a special shape of pipeline section mold from steel. Once a steel mold has been machined it can be used for only one shape of pipeline coating. Whereas the construction method using a master template 300 to make a GFRP shell body 220 reinforced with exoskeleton 240 is versatile and can be used for various different shapes of pipeline section mold whilst conserving many of the components used in making previous pipeline section molds.

Figure 7A:
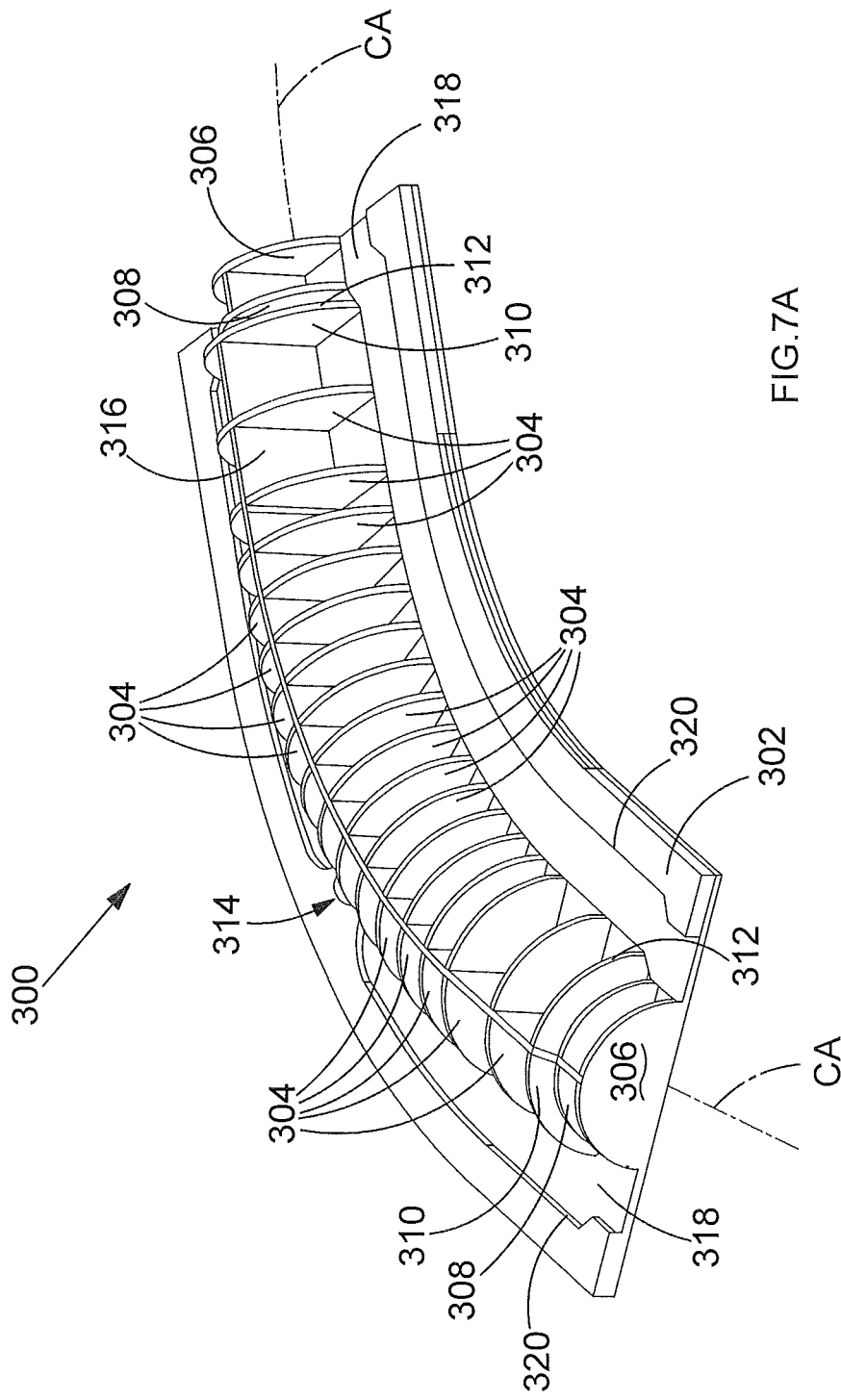
FIG. 7A shows a perspective view of a master template used for making the mold in FIG. 4.
Figure 7B:
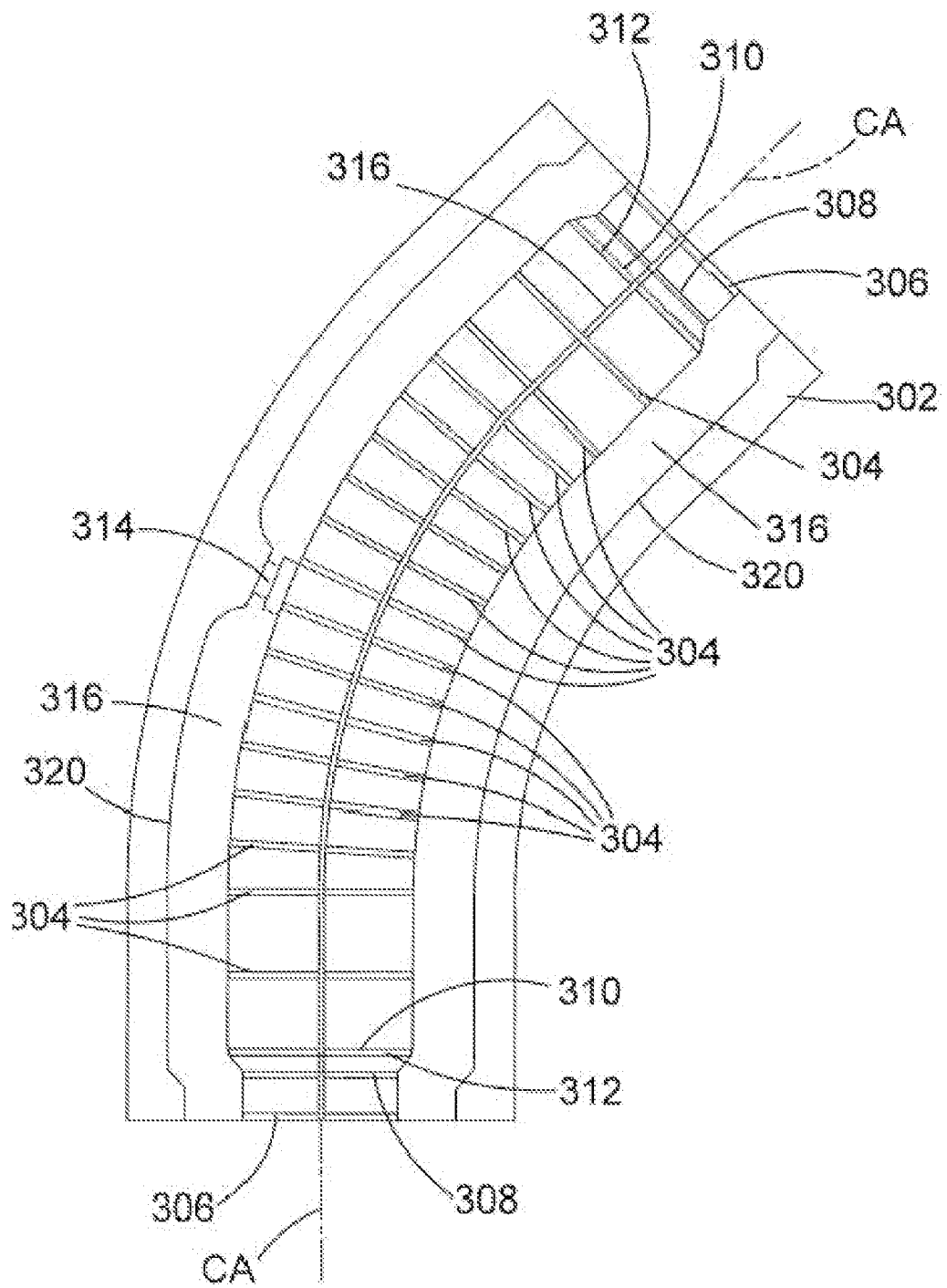
FIG. 7B shows a perspective plan view of the master template of FIG. 7A.

Referring to FIGS. 7A and 7B, the master template 300 is used to construct both the upper shell 202a and the lower shell 202b of the pipeline section mold 200 because, as mentioned above, they are a mirror image of each other in all but very minor details. The following describes construction of the upper shell 202a, but it applies equally to the lower shell 202b. The master template 300 produces a relatively smooth inside face 204 on the upper shell 202a of the pipeline section mold 200. The major 304, median 308 and chamfered 310 semi-circular discs define the main 306, restricted 210 and conical 212 sections of the upper shell 202a, respectively. The main 306, restricted 210 and conical 212 sections surround the bent pipeline section 120 into which molten polypropylene coating 122 is injected by the IMPP machine 10. The minor semi-circular discs 306 define the restricted sections 210 of the upper shell 202a which seal the ends 124a, 124b of the pipeline section 120 to prevent escape of the molten polypropylene. The semi-circular infill disc 214 defines the shape of the point of the upper shell 202a that is coupled to the accumulator delivery pipe 70. The recessed part 318 of the base template 302 defines the extent of the longer rim 222l and the shorter rim 220s of the shell body 220.

Figure 18:
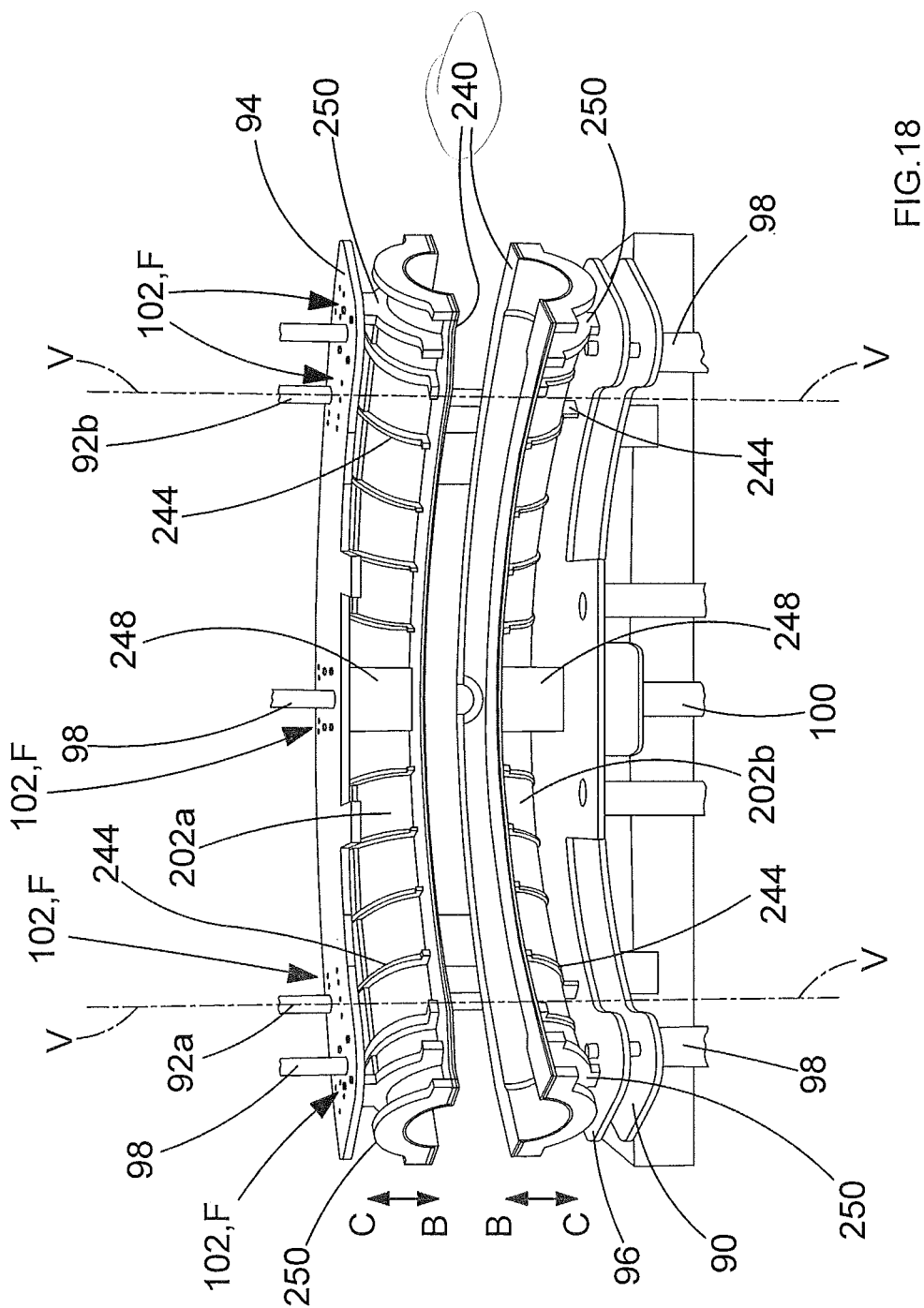
FIG. 18 shows a perspective view of the an upper shell and a lower shell of a mold similar to the mold in FIG. 4 in an open position.

Referring to FIG. 18, the upper shell 202a is fastened to the upper mold plate 94, by fasteners F through the fixture holes 102, at the pick-up points of the thick major profiled section 244, the H-shaped major profiled section 248 and the thick median profiled section 250 of the upper shell's exoskeleton 240. Likewise, the lower shell 202b is fastened to the lower mold plate 96, by fasteners F through the fixture holes 102, at the pick-up points of the thick major profiled section 244, the H-shaped major profiled section 248 and the thick median profiled section 250 of the lower shell's exoskeleton 240. As mentioned above, the guide rails 92a, 92b of the mold support assembly 80 guide sliding movement of the upper 94 and lower 96 mold plates so that the upper 202a and the lower 202b shells can be opened and closed along a vertical axis V-V of the guide rails 92a, 92b.

This is a neater, smaller and less complex solution than a clam-style opening as is used with all-steel IMPP molds for bent pipeline sections.

Figure 19:
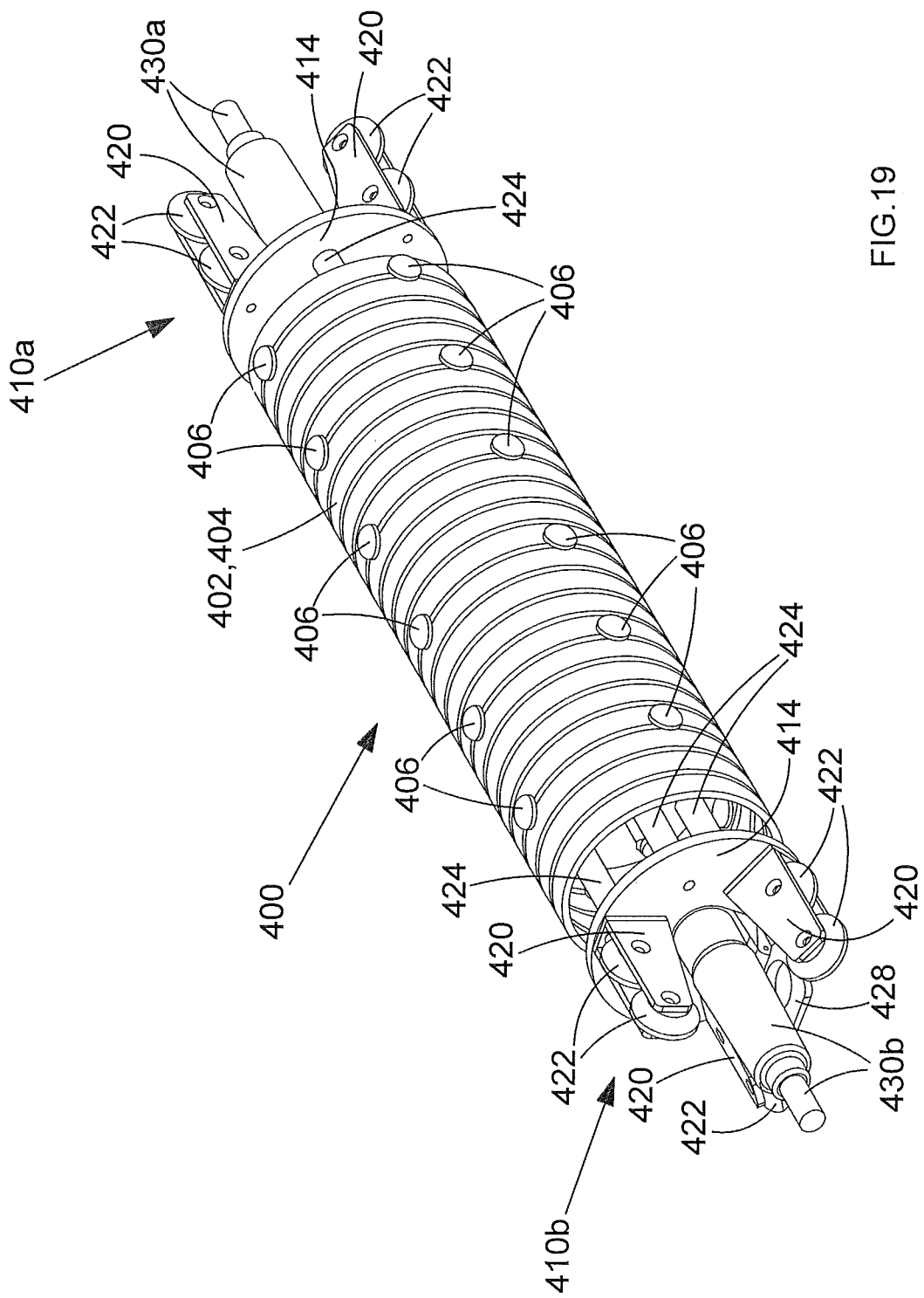
FIG. 19 shows a perspective view of an internal pipeline heating coil assembly.
Figure 20:
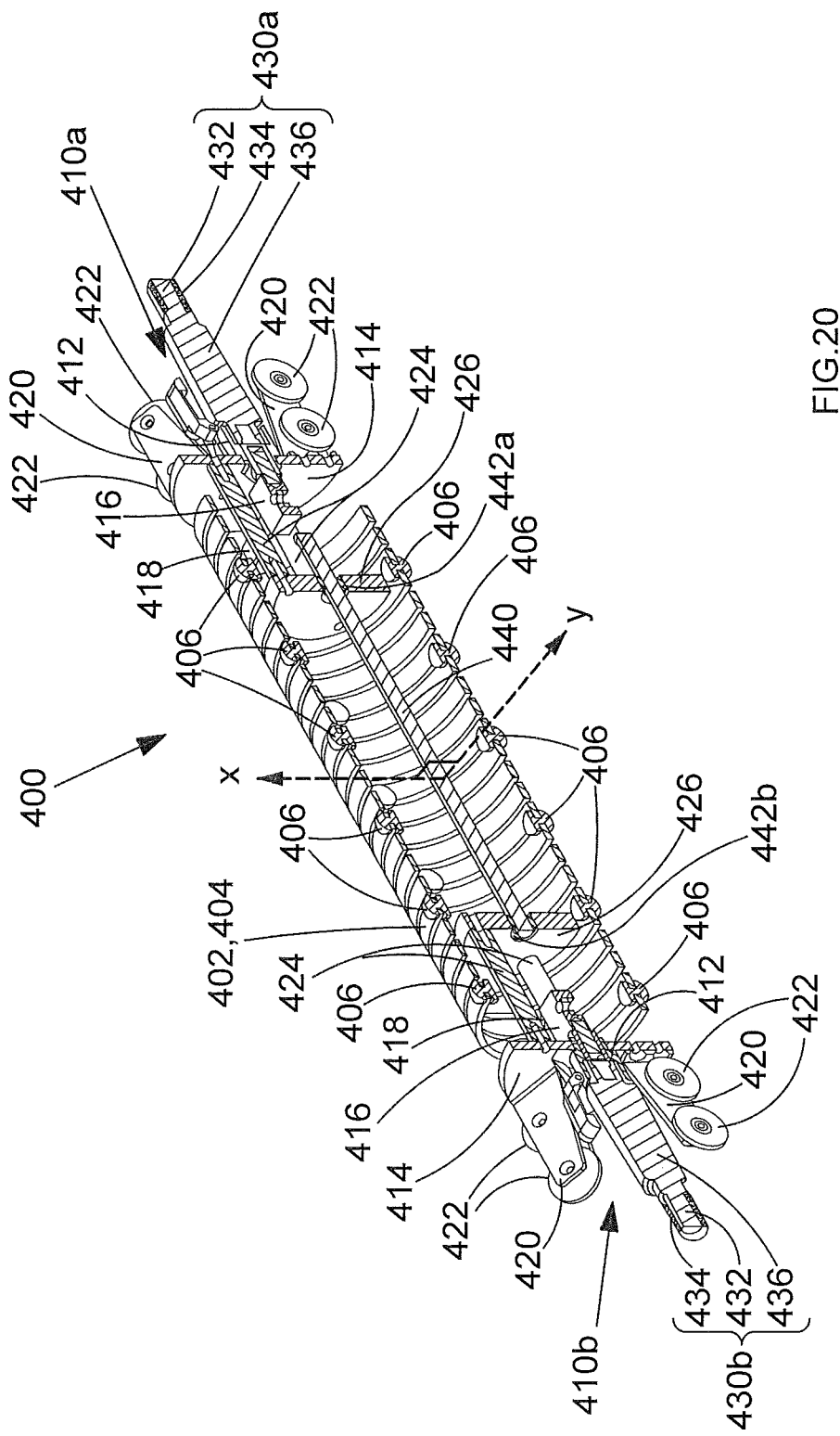
FIG. 20 shows a cross-sectional view of the internal pipeline heating coil assembly of FIG. 19.
Figure 21:
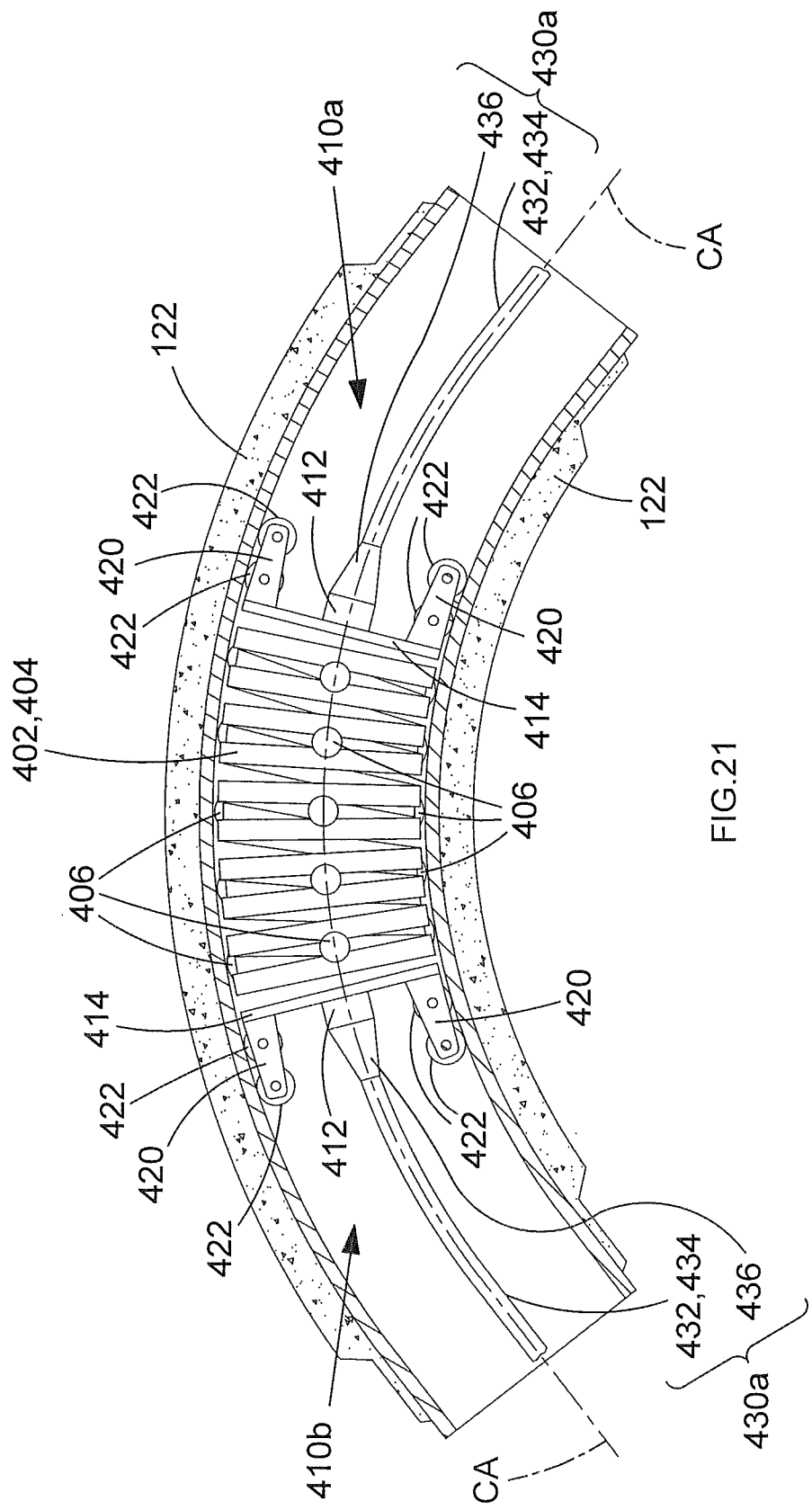
FIG. 21 shows a horizontal cross-sectional view of the bent pipeline section exposing the internal pipeline heating coil assembly inside.

Referring to FIGS. 19 to 21, an internal pipe heating assembly 400 is a vehicle which comprises a copper induction coil 402 arranged in a tight helix spanning a first wheel chassis 410a at one end of the internal pipe heating assembly 400 and a second wheel chassis 410b at an opposite end of the internal pipeline heating assembly 400. The first wheel chassis 410a and second 410b wheel chassis are connected by an elongate tie-bar 440 defining a longitudinal axis. The internal pipeline heating assembly 400 is manually pulled back and forth inside the bent pipeline section 120 by a first cable 430a connected to the first wheel chassis 410a and a second cable 430b connected to the second wheel chassis 410b. The tie bar 430 restricts expansion and contraction of the distance between the first 410a and second 410b wheel chassis along the longitudinal axis of the tie-bar 430. Alternatively, the internal pipeline heating assembly 400 may be manually pulled back and forth inside the bent pipeline section 120 by cords (not shown) connected to an eyelet on the first wheel chassis 410a and a corresponding eyelet 428 on the second wheel chassis 410b.

The first 430a and second 430b cables are substantially the same, albeit pointing in opposite directions in relation to the longitudinal axis of the tie bar 440. The construction of the first cable 430a shall be described, it being understood that this description applies equally to the second cable 430b. The first cable 430a comprises at its core an electrical power supply cable 432 surrounded by an insulating sheath 434. The first cable 430 comprises a plug 436 for electrical and mechanical connection to a socket 412 in the first wheel chassis 410a. The plug 426 is detachably connected to the socket 412 by any mechanical connection capable of withstanding tension in the cables 430a, 430b used to pull the internal pipeline heating assembly 400 through a bent pipeline section 120, like, for example, a twist-operated bayonet fitting or a threaded fitting.

The first 410a and second 410b wheel chassis of the internal pipeline heating assembly 400 are substantially the same, albeit pointing in opposite directions in relation to the longitudinal axis of the tie bar 440. The construction of the first wheel chassis 410a shall be described, it being understood that this description applies equally to the second wheel chassis 410b.

The first wheel chassis 410a comprises the socket 412 mounted to the centre of a circular end cap 414 made of rigid insulative material. The socket 412 protrudes through the circular end cap 414 from the side of the plug 436 to the opposite side of the circular end cap 414 where it supports a gland 416 protruding from the centre of the socket 412. The gland 416 comprises a conductive material and it supports an electrical connection 418. The socket 412 and the plug 436 are made of insulative material. The electrical supply cable 432 is electrically coupled to a first end of the induction coil 402 via the gland 416 and the electrical connection 418 when the plug 436 is received in the socket 412.

The first wheel chassis 410a comprises three guide wheel assemblies 420 each having a pair of freely-rotatable guide wheels 422 on the same side of the circular end cap 414 as the socket 412 and an elongate bar 424 on the opposite side of the circular end cap 414. The guide wheel assemblies 420 are arranged at equiangular intervals of 120 degrees about the longitudinal axis of the tie bar 440.

Each of the three pairs of guide wheels 422 is arranged to run along the inside of the bent pipeline section 120, as is best shown in FIG. 21. One guide wheel 422 of each pair leads the other guide wheel 422 of the pair in whichever direction of movement that the first wheel chassis 410a takes through the tubular inside face of the bent pipeline section 120. The axes of each pair of wheels 422 are arranged in a line tangential to the curved central axis CA of the bent pipeline section 120. Thus, the first wheel chassis 410a is guided along the curved central axis CA by contact between the internal profile of the bent pipeline section 120 and the pairs of guide wheels 422. The first wheel chassis 410a follows the path of the central axis CA faithfully. The first wheel chassis 410a is supported by the pairs of guide wheels 422 through 360 degrees about the central axis CA.

The three elongate bars 424 protrude away from the circular end cap 414 inside about 20 percent of the length of the induction coil 402 where they connect to a circular support block 426 made of rigid insulative material. The circular support block 426 has smaller diameter than the inside diameter of the induction coil 402 so that it fits inside. The circular support block 426 has larger diameter than a circle circumscribed by the three elongate bars 424 about the longitudinal axis of the tie bar 430. The circular end cap 414 has a diameter approximately the same as the outside diameter of the induction coil 402 both of which are approximately ten percent smaller than the inside diameter of the bent pipeline section 120 so that internal pipeline heating assembly 400 fits inside.

The tie-bar 440 comprises a self-aligning bearing 442a, 442b at, or near, each end of the tie bar 440. One bearing 442a is housed at the centre of the first wheel chassis's circular support black 426. The other bearing 442b is housed at the centre of the second wheel chassis's circular support black 426. Copper is inherently ductile and the induction coil 402 behaves like a spring. The self-aligning bearings 442a,442b and the induction coil 402 permit pivoting movement of the end caps 414, and therefore the whole of the first 410a and second 410b wheel chassis, in relation to the tie bar 430 in both of the x axis and the y axis. The x and y axes are orthogonal and they occupy a plane perpendicular to the longitudinal axis of the tie bar 440. However, the self-aligning bearings 442a,442b and resilience in the helical induction coil 402 tend to return, or maintain, the induction coil 402 and the elongate bars 424 in line with the longitudinal axis of the tie bar 430 so that the internal pipeline heating assembly 400 naturally adopts a generally cylindrical shape.

The helical induction coil 402 is coated with an insulative rubber silicon sleeve 404 to prevent a short circuit between the bent pipeline section 120 and the indication coil 402. Gaps at regular interval along, and around, the helical induction coil 402 are occupied by button-shaped spacers 406 made of insulative material like, for example, PTFE. The spacers 406 help to maintain a space between the inside of the bent pipeline section 120 and the indication coil 402. This helps to reduce any wear on the rubber silicon sleeve 404 that may be caused by friction with the inside of the bent pipeline section 120.

In use, the induction coil 402 of the internal pipeline heating assembly 400 is supplied with an electrical supply from a user-operable induction heating generator (not shown). The electrical supply to the induction coil 402 is variable by an operator within a range of 20 to 180 Volts, 30 to 700 Amperes and 400 to 500 Hz to achieve the right heat distribution and temperature in the bent pipeline section 120.

In use, the internal pipeline heating assembly 400 is manually pulled back and forth inside the bent pipeline section 120 by the first 430a and second 430b cables at something, like, for example, one meter per minute. The induction coil 402 induces eddy currents in the adjacent part of the steel bent pipeline section 120 to cause localized heating of the bent pipeline section 120. The first wheel chassis 410a guides movement of one half of the induction coil 402 and the second wheel chassis 410b guides movement of the other half of the induction coil 402 through the tubular inside face of the bent pipeline section 120. Articulation in the self-aligning bearings 442a,442b and elasticity in the induction coil 402 allows the internal pipeline heating assembly 400 to adapt to the inner profile of the bent pipeline section 120. The induction coil 402 follows the path of the central axis CA faithfully.

The process of coating a new uncoated steel bent pipeline section 120 is described as follows. Initially, a first thin layer of a primer, such as an epoxy-based material, is applied in either liquid or powdered form to the outer surface of the steel bent pipeline section 120. To ensure a good bond between the bent pipeline section 120 and the primer, the bent pipeline section 120 is typically blast cleaned and etched with an appropriate anchor pattern.

A second layer of polypropylene that has been chemically modified to act as an adhesive is applied over the primer during the curing time of the primer. While curing of the primer is ongoing a third layer of polypropylene is applied.

The IMPP injection molding machine 10 is started by an operator. The extruder 44 heats polypropylene pellets from a solid state to a molten state in preparation for pumping the molten polypropylene to the accumulators 62a,62b.

The stand arms 144a,144b are fastened to the stand base 142 in an orientation suited to receive the shape of the bent pipeline section 120. The ends 124a,124b of the bent pipeline section 120 are clamped to the clamping collars 148a, 148b of at top of the stand arms 144a,144b with the central axis CA in a generally horizontal plane.

An operator connects the internal pipeline heating assembly 400 to an electrical supply from an induction heating generator and pulls the internal pipeline heating assembly 400 back and forth, at about one meter per minute, along the inside of the bent pipeline section 120 using the cables 430a,430b. This may be done automatically if an appropriate winch system is available. The electrical current in the induction coil 402 induces eddy currents in the steel bent pipeline section 120 to cause localized heating of up to about 180 degrees centigrade. The operator uses an infrared heat sensor to detect heat distribution and moves the internal pipeline heating assembly 400 to achieve as near to even heat distribution in the bent pipeline section 120 as is possible. If necessary, the operator may vary the speed at which the internal pipeline heating assembly 400 is pulled back and forth in the bent pipeline section 120. Articulation in the self-aligning bearings 442a,442b and elasticity in the induction coil 402 allows the internal pipeline heating assembly 400 to adapt to the curve of the bent pipeline section 120 and navigate its way through without becoming stuck. The internal pipeline heating assembly 400 preheats the bent pipeline section 120 before the process of coating with the third layer of polypropylene begins. The third layer of polypropylene coating 122 is applied over the first layer of primer and the second layer of chemically modified polypropylene during the curing time of the primer so as to allow the layers to bond. Pre-heating the steel of the bent pipeline section 120 helps avoid short fill of the pipeline section mold 200 and improves adherence of the polypropylene coating 122 to the primer and the bent pipeline section 120.

The bent pipeline section 120 and the bent pipeline section stand assembly 140 are rolled towards the IMPP injection molding machine 10 with upper 202a and lower 202b shells of the pipeline section mold 200 held on an open position by the mold support assembly 80. The bent pipeline section 120 is maneuvered to the centre of the upper 202a and lower 202b shells. The orientation of the stand arms 144a,144b is such that the pipeline section mold 200 fits in the middle with little space to spare so that an operator can see when the bent pipeline section 120 is correctly positioned in relation to the pipeline section mold 200.

The control circuit 110, under the control of an operator who may be at a remote location, causes the support frame rams 98 to close the upper 202a and lower 202b shells of the pipeline section mold 200 tightly by applying a pressure of up to 200 bar (20,000,000 Pa). The sealed sections 208 of the upper 202a and lower 202b shells grip and seal the ends 124a,124b of the bent pipeline section 120. Any slight misalignment between the bent pipeline section 120 and the pipeline section mold 200 is corrected by engagement between the bent pipeline section 120 and the sealed sections 208 of the upper 202a and lower 202b shells. The bent pipeline section stand assembly 140 can roll a small distance on the rails R to allow this correction. The infill section 214 of the upper 202a and lower 202b shells forms a connection point for the accumulator delivery pipe 70. The connection point is reinforced by the H-shaped major profile section 248.

The extruder 44, under the control of the operator, pumps molten polypropylene from the extruder outlet 48, through the extruder delivery pipe 50, past the non-return vale 52 and into the accumulators 62a,62b via their ports 66a,66b until the accumulator reservoirs 64a,64b are sufficiently full.

The accumulator delivery pipe 70 is connected to the infill section 214 of the pipeline section mold 200. The operator causes the accumulator rams 68a,68b to steadily force molten polypropylene at a pressure of up to 200 bar (20,000,000 Pa) from the accumulator reservoirs 64a,64b, back through the ports 66a,66b (but not the non-return valve 52 which prevents re-entry of molten polypropylene into the extruder assembly 40), through the accumulator delivery pipe 70, and injects it into the cavity between the main 206 section, the conical sections 212, and the restricted sections 210 of the pipeline section mold 200 and the bent pipeline section 120.

The internal pipeline heating assembly 400 continues to heat the bent pipeline section 120 while the process of polypropylene coating the bent pipeline section 120 with is ongoing. This is to help avoid short fill of the pipeline section mold 200 and improve adherence of the polypropylene coating 122 to the primer and the bent pipeline section 120.

When the IMPP injection molding machine 10 detects that the molten polypropylene has filled the cavity between the pipeline section mold 200 and the bent pipeline section 120 injection from the IMPP injection molding machine 10 automatically ceases. Filling of the pipeline section mold 200 typically takes about 15 minutes, although the time taken will vary according to the size of the bent pipe line section 120 and the pipeline section mold 200. The operator removes the internal pipeline heating assembly 400 from within the bent pipeline section 120 and disconnects it from its induction heating generator supply. Cooling and solidifying of the polypropylene coating 122 begins.

Eventually, the polypropylene coating 122 is sufficiently cool and solid to be released from the pipeline section mold 200. An operator disconnects the accumulator delivery pipe 70 from the infill section 214 of the pipeline section mold 200 and severs any residual polypropylene in the accumulator pipe 70 from an injection point 126 of the polypropylene coating 122. The control circuit 110, under the control of the operator, causes the support frame rams 98 to open the upper 202a and lower 202b shells of the pipeline section mold 200 wide enough to release the bent pipeline section 120. The bent pipeline section stand assembly 140 can be rolled away from the mold support assembly 80 on the rails R to a location remote from the IMPP injection molding machine 10. The bent pipeline section stand assembly 140 acts as a cooling frame for the recently coated bent pipeline section 120 which can cool slowly. Meanwhile, the IMPP injection molding machine 10 is ready for injection molding a new polypropylene coating 122 around another bent pipeline section 120.

The invention claimed is:

1. A mold for coating a bent pipeline section with molten coating material from an injection molding machine, wherein the mold comprises a shell of impervious material reinforced by an exoskeleton of non-distensible material, wherein the exoskeleton is constructed from an array of sections arranged at various stages along the length of the mold and is at least partially embedded in the shell.

2. The mold of claim 1, wherein the exoskeleton is made from a plurality interlocking of parts.

3. The mold of claim 2, wherein parts of the exoskeleton are made of steel and are one of welded together or mechanically connected with connectors.

4. The mold of claim 1, wherein the exoskeleton comprises parts contoured to complement an inside face of the shell.

5. The mold of claim 1, wherein the mold comprises connection means for connecting the mold to an injection molding machine.

6. The mold of claim 1, wherein the shell is made from molded material.

7. The mold of claim 6, wherein the molded material is glass-fiber reinforced plastic.

8. The mold of claim 7, wherein the molded material is at least 8 mm thick.

9. The mold of claim 1, wherein the shell comprises a plurality of mutually separable shell bodies each associated with a part of the exoskeleton and wherein the shell bodies are mutually connectable in a sealed relationship with a pipeline section located in a cavity between the shell bodies.

10. A mold for coating a bent pipeline section with molten coating material from an injection molding machine, wherein the mold comprises a shell of impervious material reinforced by an exoskeleton of non-distensible material, the shell comprising shell bodies, wherein the exoskeleton is at least partially embedded in the shell, the exoskeleton constructed of sections arranged at various stages along the length of the pipeline mold,
wherein the shell bodies are mutually connectable in a sealed relationship with the pipeline section located in a cavity between the shell bodies, and wherein a curved central axis of the mold follows a same curved path as the curved central axis of the bent pipeline section.

11. The mold of claim 10, wherein the exoskeleton is constructed from an array of profiled sections arranged at various stages along the length of the pipeline section mold, and wherein the profiled sections have inner hemi-cylindrical faces the axes of which are arranged tangential to a the curved central axis of the mold.

12. A mold for coating a bent pipeline section with molten coating material from an injection molding machine, wherein the mold comprises a shell of impervious material reinforced by an exoskeleton of non-distensible material, the shell comprising a plurality of mutually separable shell bodies, wherein the exoskeleton is constructed from profiled sections having inner hemi-cylindrical faces the axes of which are arranged tangential to the curved axis, wherein the shell bodies are separable at a common central plane in a straight line normal to a central plane and the shell bodies are opened and closed in a straight line.

13. The mold of claim 12, wherein the exoskeleton is constructed from an array of profiled sections arranged at various stages along the length of the pipeline section mold, and wherein the profiled sections have inner hemi-cylindrical faces the axes of which are arranged tangential to a the curved central axis of the mold.

14. A method of making a mold for coating a pipeline section with molten coating material from an injection molding machine, wherein the method comprises the steps of: a) forming a shell body of impervious material with an inside face having the shape of a pipeline section coating; and b) cladding the shell body with an exoskeleton of non-distensible material.

15. The method of claim 14, wherein the forming step comprises the steps of: c) laying a shell body of deformable curable material over a pipeline section coating template; d) curing the shell body; and e) removing the template from the shell body.

16. The method of claim 14, wherein the method comprises a step of assembling the exoskeleton from a plurality of parts.

17. The method of claim 16, wherein the assembling step comprises interlocking parts of the exoskeleton.

18. The method of claim 16, wherein the assembling step is preceded by a step of laser cutting parts of the exoskeleton from steel.

19. The method of claim 16, wherein the assembling step comprises welding steel parts of the exoskeleton.

20. The method of claim 16, wherein the forming step comprises laying a shell body over a pipeline section coating template, optionally wherein the shell body is glass-fiber reinforced plastic.

21. The method of claim 20, wherein the shell body of glass-fiber reinforced plastic is at least 8 mm thick.

22. The method of claim 14, wherein the cladding step comprises at least partially embedding the exoskeleton in the shell body.

23. The method of claim 14, wherein the method steps comprise making a mold having a plurality of mutually separable shell bodies, each shell body being clad by exoskeleton.

24. The method of claim 14, wherein the method steps comprise making a mold with an inside face having the shape of a coating for an irregular pipeline section or a bent pipeline section.

* * * * *